(12) United States Patent
Sato et al.

(10) Patent No.: US 11,988,545 B2
(45) Date of Patent: May 21, 2024

(54) METHOD FOR PROPOSING INSTALLATION ENVIRONMENT AND METERING DEVICE THEREFOR

(71) Applicant: A&D COMPANY, LIMITED, Tokyo (JP)

(72) Inventors: Yoshikuni Sato, Saitama (JP); Yoshikazu Nagane, Saitama (JP)

(73) Assignee: A&D COMPANY, LIMITED, Tokyo (JP)

( * ) Notice: Subject to any disclaimer, the term of this patent is extended or adjusted under 35 U.S.C. 154(b) by 434 days.

(21) Appl. No.: 17/426,970

(22) PCT Filed: Mar. 13, 2019

(86) PCT No.: PCT/JP2019/010198
§ 371 (c)(1),
(2) Date: Jul. 29, 2021

(87) PCT Pub. No.: WO2020/183633
PCT Pub. Date: Sep. 17, 2020

(65) Prior Publication Data
US 2022/0099481 A1   Mar. 31, 2022

(51) Int. Cl.
*G01G 23/36* (2006.01)
*G01G 23/01* (2006.01)
(Continued)

(52) U.S. Cl.
CPC ............ *G01G 23/36* (2013.01); *G01G 23/01* (2013.01); *G01G 23/48* (2013.01); *G06N 3/08* (2013.01)

(58) Field of Classification Search
CPC ........ G01G 23/36; G01G 23/01; G01G 23/48; G01G 23/00; G01G 23/37; G06N 3/08; G06F 16/2457; G06F 16/284
(Continued)

(56) References Cited

U.S. PATENT DOCUMENTS 4,153,122 A * 5/1979 Engels ................ G01G 19/417
177/25.15
5,056,050 A   10/1991 Fuchs et al.
(Continued)

FOREIGN PATENT DOCUMENTS

JP    S62-280624 A   12/1987
JP    H04-86530 A    3/1992
(Continued)

OTHER PUBLICATIONS

International Search Report and Written Opinion issued in the corresponding Application No. PCT/JP2019/010198 on Mar. 13, 2019.

*Primary Examiner* — Jacques M Saint Surin
(74) *Attorney, Agent, or Firm* — Studebaker & Brackett PC

(57) ABSTRACT

A proposing an improvement in an installation environment of a weighing apparatus is made by including (a) a step of acquiring, weighed data of an object (7) to be weighed from a weighing sensor (13) together with time information, (b) a step of acquiring, environmental data together with time information, (c) a step of checking, with respect to the weighed data and the environmental data, whether an amount of change of the data per unit time or an average value of the data is less than or not less than a threshold with reference to a threshold database (191) and determining influence on the apparatus, and (d) a step of making a proposal on the installation environment for each result of the determination with reference to an improvement proposal database (193).

13 Claims, 21 Drawing Sheets

(51) Int. Cl.
*G01G 23/48* (2006.01)
*G06N 3/08* (2023.01)

(58) Field of Classification Search
USPC ..................................................... 177/25.13
See application file for complete search history.

(56) References Cited

U.S. PATENT DOCUMENTS

| | | | |
|---|---|---|---|
| 7,497,137 B2* | 3/2009 | Tellenbach | G01G 23/3728 177/1 |
| 9,297,690 B2* | 3/2016 | Havimäki | G01G 23/01 |
| 9,354,109 B2* | 5/2016 | Izumo | G01G 23/01 |
| 10,823,604 B2* | 11/2020 | Kageyama | G01G 19/393 |
| 11,156,495 B2* | 10/2021 | Caregnato | G01G 19/414 |
| 2007/0119226 A1 | 5/2007 | Tellenbach et al. | |
| 2011/0203857 A1 | 8/2011 | Trautweiler | |
| 2013/0306382 A1 | 11/2013 | Izumo et al. | |
| 2014/0297229 A1 | 10/2014 | Izumo et al. | |

FOREIGN PATENT DOCUMENTS

| | | |
|---|---|---|
| JP | 2007-139768 A | 6/2007 |
| JP | 2010-266349 A | 11/2010 |
| JP | 5666930 B2 | 2/2015 |
| WO | 2013065174 A1 | 5/2013 |

* cited by examiner

Fig. 2

Threshold database    191

| Parameter name | First threshold | Second threshold |
|---|---|---|
| Atmospheric pressure | 5hpa/24h | 10hpa/24h |
| Repeatability | 2.5 μg | 4.0 μg |
| Temperature | 1.0°C/1h | 3.0°C/1h |
| Humidity | 5%/24h | 15%/24h |
| Zero-point | 0.001500g/24h | 0.003000g/24h |

Fig. 3

Improvement proposal database 193

| Parameter name | Determination value | Improvement comment |
|---|---|---|
| Atmospheric pressure | 0 | No great change in atmospheric pressure. |
| | 1 | Atmospheric pressure has changed. Weighing requires attention because buoyancy may change. |
| | 2 | Atmospheric pressure has greatly changed. Do not perform weighing because weighed value varies with buoyancy change. |
| Repeatability | 0 | Repeatability falls within the specifications. Weighing can be performed without problem. |
| | 1 | Table of repeatability scoring 1 point |
| | 2 | Table of repeatability scoring 2 points |
| Temperature | 0 | No great change in temperature. |
| | 1 | Table of temperature scoring 1 point |
| | 2 | Temperature has greatly changed. Reduce the temperature change by using air-conditioner, etc. |
| Humidity | 0 | No great change in humidity. |
| | 1 | Humidity has changed. Weighing requires attention because zero-point may change. |
| | 2 | Humidity has greatly changed. Weighing requires attention because zero-point may drift. |
| Zero-point | 0 | No great change in zero-point. |
| | 1 | Zero-point has changed. This change may be due to an environmental change. |
| | 2 | Zero-point has greatly changed. Adapt apparatus to installation environment by performing running sufficiently. |

Table of repeatability scoring 1 point

| 1-1 | Repeatability is close to specification value. Repeatability may be lowered by readjusting the installation environment. |
|---|---|
| 1-2 | Repeatability is close to specification value. Repeatability may be lowered by readjusting the installation environment. In addition, there is a sudden cause for deterioration. |
| 1-3 | Repeatability out of specifications. Readjustment of installation environment is required. |
| 1-4 | Repeatability out of specifications. Readjustment of installation environment is required. In addition, there is a sudden cause for deterioration. |

Table of repeatability scoring 2 point

| 2-1 | Repeatability has greatly deteriorated. Readjustment of installation environment is required. |
|---|---|
| 2-2 | Repeatability has greatly deteriorated. Readjustment of installation environment is required. In addition, there is a sudden cause for deterioration. |
| 2-3 | Repeatability has greatly deteriorated. There is a possibility of apparatus failure. |

Table of temperature scoring 1 point

| 1-1 | Temperature has changed. Weighing requires attention. |
|---|---|
| 1-2 | Temperature has greatly changed in a short time. Make sure that the apparatus is not in immediate proximity to a window, or check operating conditions of peripheral devices. |
| 1-3 | Temperature has finely changed. Install desktop windshield, etc., to avoid direct wind from air-conditioner. |

Fig. 7

Degree-of-importance database 192

| Type | Minimum display | Temperature | Humidity | Atmospheric pressure | Zero-point |
|---|---|---|---|---|---|
| Balance A | 1 μg (0.000001g) | 3 | 1 | 2 | 1 |
| | 10 μg (0.00001g) | 2 | 1 | 1 | 1 |
| | 0.1mg (0.0001g) | 2 | 1 | 0 | 1 |
| Balance B | 0.1mg (0.0001g) | 3 | 1 | 0 | 2 |
| Balance C | 0.1mg (0.0001g) | 1 | 2 | 0 | 1 |
| ... | ... | ... | ... | ... | ... |

Fig. 12A

Improvement proposal database 193

| | Improvement comment | |
|---|---|---|
| | Deteriorated | Improved |
| Repeatability | Repeatability has deteriorated. Readjustment of installation environment is required. | Repeatability has been improved. Keep current installation environment. |
| Temperature | Reducing temperature change improves repeatability. Zero-point change is reduced at the same time. | Temperature change has been improved. Keep current installation environment. |
| Humidity | Reducing humidity change reduces zero-point change. | Humidity change has been improved. Keep current installation environment. |
| Atmospheric pressure | Weighing requires attention until atmospheric pressure settles. | Atmospheric pressure change has been improved. |
| Zero-point | Reducing temperature change and humidity change reduces zero-point change. | Zero-point change has been improved. Keep current installation environment. |

Fig. 12B

Improvement proposal database 193

| | Improvement comment | |
|---|---|---|
| | Deteriorated | Good |
| Repeatability | Repeatability has deteriorated more than normal. Readjustment of installation environment is required. | Repeatability is good. Keep current installation environment. |
| Temperature | Temperature change different from normal has been found. Reducing temperature change improves repeatability. | No great change in temperature. Keep current installation environment. |
| Humidity | Humidity change different from normal has been found. Reducing humidity change reduces zero-point change. | No great change in humidity. Keep current installation environment. |
| Atmospheric pressure | Atmospheric pressure change different from normal has been found. Weighing requires attention until atmospheric pressure settles. | No great change in atmospheric pressure. |
| Zero-point | Zero-point change different from normal has been found. Reducing temperature change and humidity change reduces zero-point change. | No great change in zero-point. Keep current installation environment. |

Fig. 14

(i)
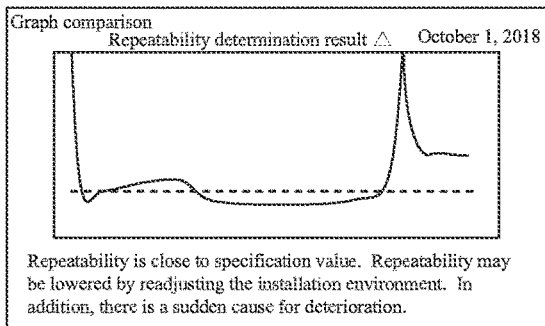
Graph comparison
Repeatability determination result △  October 1, 2018

Repeatability is close to specification value. Repeatability may be lowered by readjusting the installation environment. In addition, there is a sudden cause for deterioration.

(ii)
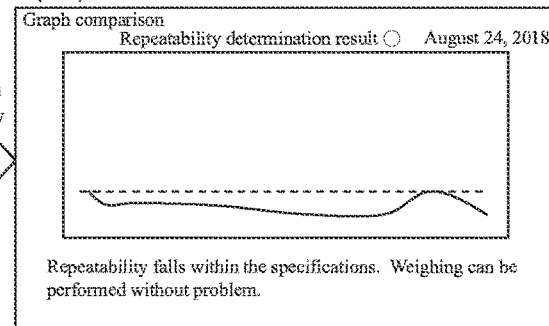
Graph comparison
Repeatability determination result ○  August 24, 2018

Repeatability falls within the specifications. Weighing can be performed without problem.

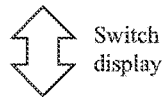
Switch display (iii)

| Numerical value comparison | October 1, 2018 | August 24, 2018 |
|---|---|---|
| Repeatability average | 3.4 ug | 2.1 ug |
| Zero-point change | 0.001962 g | 0.001012 g |
| Span value change | 0.000595 g | 0.000288 g |
| Temperature change | 3.65 ℃ | 2.55 ℃ |
| Humidity change | 6 % | 9 % |
| Atmospheric pressure change | 3 hPa | 6 hPa |

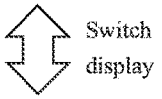
Switch display (iv)

Comparative analysis
October 1, 2018 vs. Past data (August 24, 2018)

Repeatability of specifications of balance has deteriorated compared to past data.
Zero-point change has become larger compared to past data.
Temperature change has become larger compared to past data.
Humidity change has become smaller compared to past data.
Atmospheric pressure change has become smaller compared to past data.

Reducing temperature change improves repeatability. Zero-point change is reduced at the same time.

METHOD FOR PROPOSING INSTALLATION ENVIRONMENT AND METERING DEVICE THEREFOR

CROSS-REFERENCE TO RELATED APPLICATIONS

The present application is a U.S. National Phase of PCT/JP2019/010198 filed on Mar. 13, 2019. The disclosure of the PCT Application is hereby incorporated by reference into the present Application.

TECHNICAL FIELD

The present invention relates to a method of proposing an improvement in an installation environment according to analysis results obtained by analyzing an environment in which a weighing apparatus is installed and to a weighing apparatus for the same.

BACKGROUND ART

In a weighing apparatus, for example, in a balance, it is known that environmental changes such as changes in temperature, humidity, and atmospheric pressure, etc., at a location where the balance is installed have effects on a measurement sensitivity, a zero-point, and a span value, and cause weighing errors. In particular, in an electronic balance with weighed value reading accuracy of 0.1 mg, and moreover, 1 μg or less, the effect of a weighing error caused by a change in installation environment on a weighed value is considerably large.

Therefore, there are conventional weighing apparatuses which record a temperature, a humidity, and an atmospheric pressure, etc., and use these environmental data for "Calibration" (Patent Literatures 1 and 2). However, in the conventional weighing apparatuses, environmental data were used for arithmetic processing for calibration, and were not disclosed to users. Therefore, in some cases, a user did not notice environmental changes and repeatedly performed calibration, and felt a sense of distrust when basic performance could not be obtained.

Responding to this, the applicant has proposed a weighing apparatus provided with a new function of correlating temporal fluctuations in the environmental data and the weighed data and displaying these such that a user can understand that poor performance of the apparatus was attributable to the installation environment (Patent Literature 3).

CITATION LIST

Patent Literature

Patent Literature 1: Japanese Published Unexamined Patent Application No. S62-280624
Patent Literature 2: Japanese Published Unexamined Patent Application No. 2007-139768
Patent Literature 3: Japanese Patent No. 5666930

SUMMARY OF INVENTION

Technical Problem

The weighing apparatus of Patent Literature 3 enabled a user to consider an installation environment by looking at a correlation graph. However, the weighing apparatus of Patent Literature 3 did not show how an improvement in the environment should be made based on the correlation graph. Therefore, in some cases, an inexperienced user could not perform an analysis even by looking at the correlation graph, or an analysis of the same graph may differ depending on the user. Patent Literature 3 proposes a method of performing a correlational analysis of amounts of changes in environmental data and weighed data, and determining that the environmental parameters have greater influence on the apparatus in descending order of the absolute values of the correlation coefficients, however, it was found that a parameter with a high degree of influence differed depending on the minimum display of the balance and characteristics of the balance, and a problem occurred in which the parameters could not be generally determined by this method.

An object of the present invention is to provide a method of proposing an improvement in an installation environment according to analysis results obtained by analyzing the installation environment of a weighing apparatus and to provide a weighing apparatus for the same.

Solution to Problem

In order to solve the problem described above, an installation environment proposal method for a weighing apparatus according to an aspect of the present invention includes (a) a step of acquiring, as weighed data of an object to be weighed, at least a weighed value, a zero-point, and a standard deviation of a span value from a weighing sensor together with time information, (b) a step of acquiring, as environmental data, at least an atmospheric pressure, a temperature, and a humidity from an environmental sensor together with time information, (c) a step of checking, with respect to the weighed data and the environmental data, whether an amount of change of the data per unit time or an average value of the data is less than or not less than a threshold with reference to a threshold database and obtaining a determination of influence on the weighing apparatus, and (d) a step of making a proposal on an installation environment for each result of the determination with reference to an improvement proposal database.

In the aspect described above, it is also preferable that in the step (c), a plurality of the thresholds are set in stages, and in the determination, a determination value of one of the plurality of stages is given according to the thresholds, and in the step (d), an improvement comment in association with the determination value and stored in the improvement proposal database is read out and a proposal on the installation environment is made.

In the aspect described above, it is also preferable to further include (e) a step of storing an analysis in the step (c) in an analysis history database, (f) a step of reading out one of past analyses or an analysis obtained through learning with reference to the analysis history database, and with respect to each of the weighed data and the environmental data, comparing the latest analysis with the past analysis or comparing the latest analysis with the analysis obtained through learning, and (g) a step of making a proposal on the installation environment by reading out an improvement comment contrasting the latest environment with a past environment according to results of the comparison with reference to the improvement proposal database.

In the aspect described above, it is also preferable that in the step (c), the determination is made in order of (i) atmospheric pressure, (ii) standard deviation of span value, (iii) temperature and humidity, and (iv) zero-point.

In the aspect described above, it is also preferable that the proposal is displayed together with a temporal change graph of the weighed data and/or the environmental data related to the proposal.

In addition, in order to solve the problem described above, an installation environment proposal method for a weighing apparatus according to another aspect of the present invention includes (a) a step of acquiring, as weighed data of an object to be weighed, at least a weighed value, a zero-point, and a standard deviation of a span value from a weighing sensor together with time information, (b) a step of acquiring, as environmental data, at least an atmospheric pressure, a temperature, and a humidity from an environmental sensor together with time information, (c) a step of checking, with respect to each of the weighed data and the environmental data, whether an amount of change of the data per unit time or an average value of the data is less than or not less than a threshold with reference to a threshold database and giving a determination value of one of a plurality of stages, (d) a step of reading degrees of importance set at least for the temperature, the humidity, the atmospheric pressure, and the zero-point in consideration of at least reading accuracy of the weighing apparatus and characteristics of the weighing apparatus with reference to a degree-of-importance database, (e) a step of scoring based on the determination value and the degree of importance, and (f) a step of reading out an improvement comment in association with the determination value and stored in an improvement proposal database with reference to the improvement proposal database and making a proposal on an installation environment in descending order of the score.

In the aspect described above, it is also preferable that in the step (f), the improvement comment is displayed together with the determination value of the standard deviation.

In the aspect described above, it is also preferable that in the step (f), the improvement comment is displayed together with information based on the score.

In the aspect described above, it is also preferable to further include (g) a step of storing an analysis in the step (c) in an analysis history database, (h) a step of reading out one of past analyses or an analysis obtained through learning with reference to the analysis history database, and with respect to each of the weighed data and the environmental data, comparing the latest analysis with the past analysis or comparing the latest analysis with the analysis obtained through learning, and (i) a step of making a proposal on the installation environment by reading out an improvement comment contrasting the latest environment with a past environment according to results of the comparison with reference to the improvement proposal database.

In the aspect described above, it is also preferable that the proposal is displayed together with a temporal change graph of the weighed data and/or the environmental data related to the proposal.

Further, in order to solve the problem described above, a weighing apparatus according to an aspect of the present invention includes a weighing sensor configured to detect weighed data of an object to be weighed, an environmental sensor configured to detect environmental data of an installation environment, a system timer for obtaining detection times of the weighed data and the environmental data, a storage unit configured to record the weighed data and the environmental data together with time information, an arithmetic processing unit configured to analyze the weighed data and the environmental data, and a display unit configured to display analysis results of the arithmetic processing unit and/or an output unit configured to output the analysis results to an external device, where the storage unit includes a threshold database storing a plurality of thresholds set in stages for each of the weighed data and the environmental data and an improvement proposal database storing improvement comments, and the arithmetic processing unit checks, with respect to each of the weighed data and the environmental data, whether an amount of change of the data per unit time or an average value of the data is less than or not less than a threshold with reference to the threshold database, gives a determination value of one of the plurality of stages, reads out the improvement comment in association with the determination value with reference to the improvement proposal database, and makes a proposal on the installation environment.

In the aspect described above, it is also preferable that the storage unit further includes a degree-of-importance database storing degrees of importance set at least for the temperature, the humidity, the atmospheric pressure, and the zero-point in consideration of reading accuracy of the weighing apparatus and characteristics of the weighing apparatus, and the arithmetic processing unit reads out the degree of importance from the degree-of-importance database, performs scoring based on the determination value and the degree of importance, and makes a proposal on the installation environment in descending order of the score.

In the aspect described above, it is also preferable that the storage unit further includes an analysis history database, and the arithmetic processing unit stores the weighed data, the environmental data, the amounts of changes, and the average values used for the latest analysis in the analysis history database, reads out one of past analyses or an analysis obtained through learning with reference to the analysis history database, and with respect to each of the weighed data and the environmental data, compares the latest analysis and the past analysis or compares the latest analysis and the analysis obtained through learning, and according to the comparison results, reads out an improvement comment contrasting the latest environment with a past environment with reference to the improvement proposal database, and makes a proposal on the installation environment.

Advantageous Effects of Invention

According to the installation environment proposal method and the weighing apparatus of the present invention, by analyzing temporal fluctuations of environmental data and weighed data, an installation environment improvement way can be proposed according to the analysis results.

BRIEF DESCRIPTION OF DRAWINGS

FIG. 2 is an example of a threshold database to be used in the weighing apparatus.

FIG. 3 is an example of an improvement proposal database to be used in the weighing apparatus.

FIG. 7 is an example of a degree-of-importance database to be used in the weighing apparatus.

FIG. 12A is an example of an improvement proposal database to be used in the weighing apparatus.

FIG. 12B is an example of an improvement proposal database to be used in the weighing apparatus.

FIG. 14 is a display example of analysis results obtained by the weighing apparatus.

DESCRIPTION OF EMBODIMENTS

Next, preferred embodiments of the present invention will be described with reference to the drawings.

First Embodiment

Figure 1:
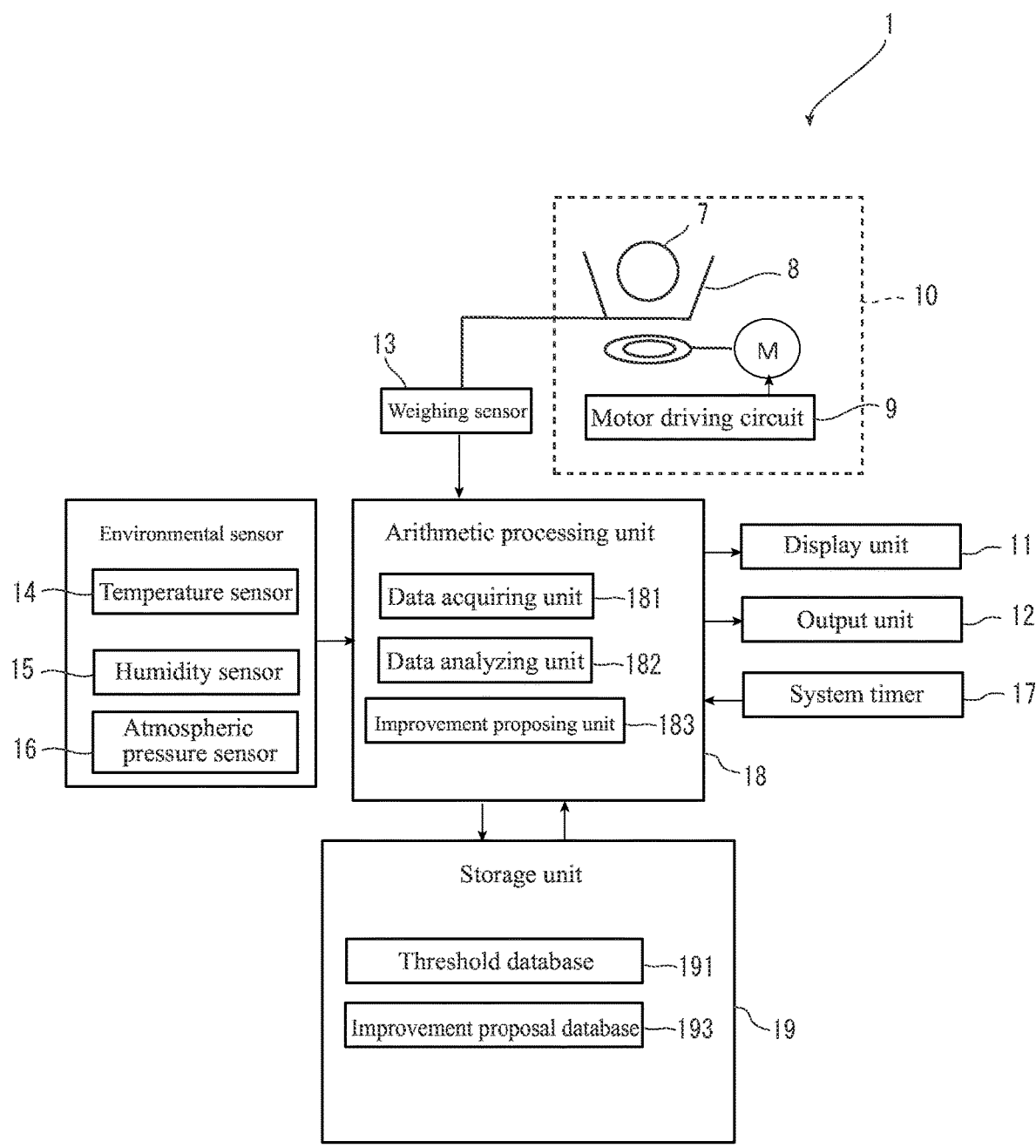
FIG. 1 is a configuration block diagram of a weighing apparatus according to a first embodiment of the present invention.

FIG. 1 is a configuration block diagram of a weighing apparatus 1 according to a first embodiment. The weighing apparatus 1 is an electronic balance. The weighing apparatus 1 of the present embodiment includes a built-in balance weight adding/removing unit 10, a display unit 11, an output unit 12, a weighing sensor 13, a temperature sensor 14, a humidity sensor 15, an atmospheric pressure sensor 16, a system timer 17, an arithmetic processing unit 18, and a storage unit 19.

The weighing sensor 13 is an electromagnetic equilibrium system sensor. Alternatively, the weighing sensor may be a strain gauge system or capacitance system sensor. To the weighing sensor 13, a load of an object to be weighed placed on a weighing pan (not illustrated) is transmitted through a beam (not illustrated). Data detected by the weighing sensor 13 is analog-output, and output as an A/D converted weighing signal to the arithmetic processing unit 18.

The built-in balance weight adding/removing unit 10 includes a built-in balance weight 7, a built-in balance weight receiving portion 8, and a motor driving circuit 9. The built-in balance weight adding/removing unit 10 drives a cam and a motor by the motor driving circuit 9 to load and unload the built-in balance weight 7 onto and from the built-in balance weight receiving portion 8 in a prescribed cycle (for example, once per minute). The built-in balance weight receiving portion 8 is in association with the beam connected to the weighing sensor 13, and the load of the built-in balance weight 7 is transmitted to the weighing sensor 13. The built-in balance weight adding/removing unit 10 lifts up and down the built-in balance weight receiving portion 8 according to a command from the arithmetic processing unit 18 and automatically loads and unloads the built-in balance weight 7. The built-in balance weight adding/removing unit 10 may be a mechanism that lifts the built-in balance weight 7 up and down by air supply to and air release from an air bag.

The temperature sensor 14 (environmental sensor) detects a temperature of a location where the weighing apparatus 1 is installed. A temperature (environmental data) output from the temperature sensor 14 is A/D converted and output to the arithmetic processing unit 18.

The humidity sensor 15 (environmental sensor) detects a humidity of the location where the weighing apparatus 1 is installed. The humidity (environmental data) output from the humidity sensor 15 is A/D converted and output to the arithmetic processing unit 18.

The atmospheric pressure sensor 16 (environmental sensor) detects an atmospheric pressure of the location where the weighing apparatus 1 is installed. The atmospheric pressure (environmental data) output from the atmospheric pressure sensor 16 is A/D converted and output to the arithmetic processing unit 18.

The environmental sensor may include, in addition to these, a vibration sensor, a static sensor, a wind speed sensor, a tilt sensor, etc.

The system timer 17 calculates a current time (system time) of the weighing apparatus 1 by performing a calculation of count values of a hardware timer and a software timer.

The display unit 11 has a touch-panel type liquid crystal display, and is provided on a front surface of a main body case (not illustrated) of the weighing apparatus 1. The weighing apparatus 1 can be operated from the display unit 11. The weighing apparatus 1 can also be operated from an operation button (not illustrated).

The output unit 12 is an RS232C connector and/or a USB connector, and is provided on a left/right side surface or a rear side surface of the main body case of the weighing apparatus 1. Data obtained by the weighing apparatus 1 can be output to an external device, for example, an external personal computer or a USB memory through the output unit 12.

The arithmetic processing unit 18 is a microcontroller configured by mounting a CPU, a ROM, a RAM, etc., on an integrated circuit. The arithmetic processing unit 18 calculates a weighed value of an object to be weighed (the built-in balance weight 7 is also included in the object to be weighed) from a weighing signal from the weighing sensor 13. Further, the arithmetic processing unit 18 includes a data acquiring unit 181, a data analyzing unit 182, and an improvement proposing unit 183.

The data acquiring unit 181 acquires a "Weighed value" at the time of loading of the built-in balance weight 7 and "Zero-point" at the time of no-load by controlling the built-in balance weight adding/removing unit 10, and calculates a "Span value" as a difference between the weighed value of the built-in balance weight 7 and the zero-point, and "Repeatability" as a standard deviation of the span value. Along with this, the data acquiring unit 181 acquires environmental data from the temperature sensor 14, the humidity sensor 15, and the atmospheric pressure sensor 16. The data acquiring unit 181 acquires time information from the system timer 17 when acquiring the weighed data and when acquiring the environmental data. The data acquiring unit 181 records the acquired weighed data (a weighed value, a zero-point, a span value, repeatability) and the acquired environmental data (a temperature, a humidity, an atmospheric pressure) in the storage unit 19 together with the time information.

Based on the data acquired by the data acquiring unit 181, the arithmetic processing unit 18 can display temporal fluctuations of the weighed data, temporal fluctuations of the environmental data, and correlation of temporal fluctuations of the weighed data and the environmental data on the display unit 11 in the form of graphs. These graphs can also be displayed on a display unit (not illustrated) of an external device through the output unit 12. Details of this are described in Japanese Patent No. 5666930.

With respect to the weighed data and the environmental data recorded by the data acquiring unit 181, the data analyzing unit 182 checks whether an amount of change of the data per unit time or an average value of the data per unit time is less than or not less than a threshold with reference to a threshold database 191 described later. Specifically, with regard to the temperature, humidity, atmospheric pressure, and zero-point, an amount of change of the data per unit time is checked. With regard to repeatability, an average value of the data per unit time is checked. The unit time can be arbitrarily changed according to a sampling time, and can be set for each of the parameters (temperature, humidity, atmospheric pressure, zero-point, and repeatability).

For each of these parameters, a plurality of thresholds are set in stages. The data analyzing unit 182 gives a "Determination value" (score) based on the plurality of thresholds. For example, the data analyzing unit 182 gives determination values in three stages, that is, less than a first threshold: a score of 0 points (having no influence), not less than the first threshold and less than a second threshold: a score of 1 point (having an influence), not less than the second threshold: a score of 2 points (having a strong influence). At this time, when there is a rule set in advance for each of the parameters, the data analyzing unit 182 acquires information based on the rule as well.

Based on the result of the determination made by the data analyzing unit 182, that is, the "Determination value," the improvement proposing unit 183 reads out an improvement comment in association with the determination value with reference to an improvement proposal database 193 described later, and displays the improvement comment on the display unit 11. The determination value may be converted into a rank expression that a user easily understands, for example, a symbol such as "○," "Δ," or "×" or a character.

The storage unit 19 is a flash memory such as an SD card or a hard disk drive, and stores various programs for the control and analysis of the arithmetic processing unit 18. The weighed data and the environmental data acquired by the data acquiring unit 181 are recorded in the storage unit 19. Further, the storage unit 19 has a threshold database 191 and an improvement proposal database 193. The threshold database 191 and the improvement proposal database 193 can be rewritten from an external device.

In the threshold database 191, pluralities of thresholds of amounts of changes in temperature, humidity, atmospheric pressure, and zero-point per unit time and thresholds of average value of repeatability are stored in stages. FIG. 2 is an example of the threshold database 191 to be used in the weighing apparatus 1. In the example of FIG. 2, in the threshold database 191, for each of parameters of temperature, humidity, atmospheric pressure, zero-point, and repeatability, a first threshold and a second threshold larger than the first threshold are stored.

In the improvement proposal database 193, improvement comments in association with determination values to be determined by the data analyzing unit 182 are stored. In the improvement proposal database 193, parameter names, determination values, and improvement comments are stored. There is a case where the improvement comments have one-to-one correspondence with the determination values, and a case where the improvement comments have subordinate tables in association with the determination values. When a subordinate table is prepared, the data analyzing unit 182 selects one comment from the subordinate table based on a rule set in advance for each parameter.

FIG. 3 is an example of the improvement proposal database 193 to be used in the weighing apparatus 1. In the example of FIG. 3, parameters are atmospheric pressure, repeatability, temperature, humidity, and zero-point. The determination values are in three stages of a determination value scoring 2 points (having a strong influence), a determination value scoring 1 point (having an influence), and a determination value scoring 0 points (having no influence). Improvement comments are prepared with one-to-one correspondence with the determination values for atmospheric pressure, humidity, and zero-point. For temperature, a subordinate table is prepared for the case of a determination value scoring 1 point. For repeatability, subordinate tables are prepared for the case of a determination value scoring 1 point and the case of a determination value scoring 2 points.

In a subordinate table of temperature scoring 1 point, three different kinds of comments are prepared. Any one of the comments is selected based on a rule set in advance. A comment (1-2) is selected when a time during which the temperature is not lower than the first threshold is relatively short in comparison with a sampling time (for example, when the time during which the temperature is higher than the threshold is 2 hours or shorter with respect to a sampling time of 24 hours). A comment (1-3) is selected when a time during which the temperature is not lower than the first threshold intermittently appears (for example, appears 8 times or more during the sampling time). A comment (1-1) is selected when neither of the comments (1-2) and (1-3) is applicable.

In a subordinate table of repeatability scoring 1 point, four different comments are prepared. Any one of the comments is selected based on a rule set in advance. A comment (1-1) and a comment (1-2) are selected when repeatability is close to a specification value (for example, when an average is 3.5 µg or less with respect to an average of 2.5 µg as a specification value). The comment (1-2) is selected when a time during which repeatability is not less than the first threshold is relatively short compared with the sampling time. The comment (1-1) is selected when the comment (1-2) is not applicable. A comment (1-3) and a comment (1-4) are selected when it cannot be said that repeatability is close to a specification value (first threshold) (for example, when an average is more than 2.7 µg with respect to an average of 2.5 µg as a specification value). The comment (1-4) is selected when a time during which repeatability is not less than the first threshold is relatively short compared with the sampling time. The comment (1-3) is selected when the comment (1-4) is not applicable.

In a subordinate table of repeatability scoring 2 points, three different comments are prepared. Any one of the comments is selected based on a rule set in advance. A comment (2-2) is selected when a time during which repeatability is not less than the second threshold is relatively short compared with the sampling time. A comment (2-3) is selected when the time during which repeatability is not less than the second threshold is relatively long compared with the sampling time (for example, the time during which repeatability is more than the threshold is 20 hours or longer with respect to the sampling time of 24 hours). When repeatability is significantly poor, it is preferable to recommend repair of the balance as with the comment (2-3). A comment (2-1) is selected when neither of the comments (2-2) and (2-3) is applicable.

Details of the improvement comments are not limited to the example illustrated in FIG. 3. The subordinate tables are not limited to the example illustrated in FIG. 3. The subordinate tables may be prepared based on information other than the rules illustrated above.

Figure 4:
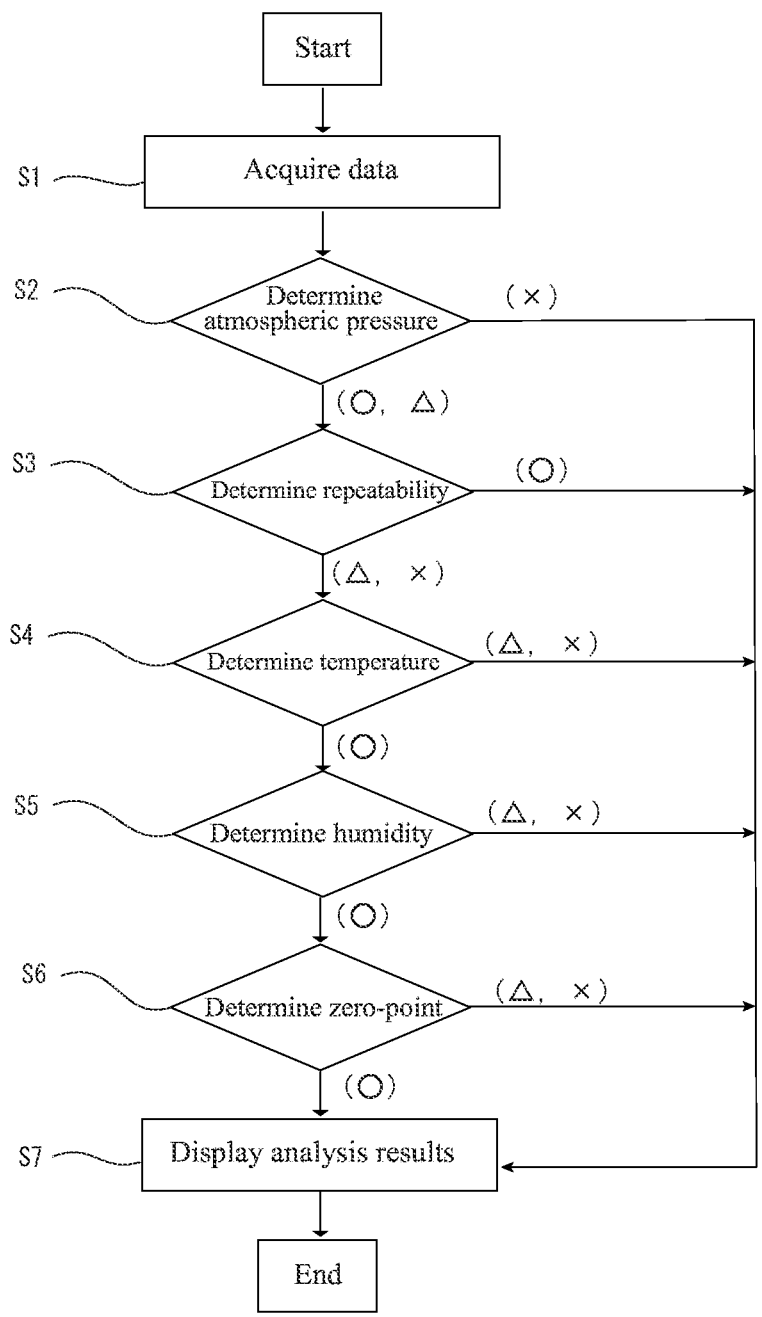
FIG. 4 is a flowchart of an installation environment analysis by the weighing apparatus.

By using the configuration described above, the weighing apparatus 1 of the present embodiment performs an installation environment analysis as follows. FIG. 4 is a flowchart of an installation environment analysis by the weighing apparatus 1 of the present embodiment.

When an installation environment analysis is started, the processing shifts to Step S1, and the data acquiring unit 181 functions. The data acquiring unit 181 lifts the built-in balance weight 7 up and down. The data acquiring unit 181 acquires weighed data (a weighed value, a zero-point, a span value, and a standard deviation of the span value) of the built-in balance weight 7, and records the weighed data in the storage unit 19 together with time information. Simultaneously, the data acquiring unit 181 acquires environmental data (a temperature, a humidity, and an atmospheric pressure) of a location where the weighing apparatus 1 is installed, and records the environmental data in the storage unit 19 together with time information. The sampling time is as set in advance (for example, several hours to several days). A sampling interval is as set in advance (for example, once an hour). The sampling time and the sampling interval can be arbitrarily changed not only by a technical expert but also by a user. When sampling is finished, the processing shifts to Step S2. When the weighing apparatus does not include the built-in balance weight adding/removing unit 10, weighed data of another object to be weighed loaded onto and unloaded from the weighing pan may be acquired.

When the processing shifts to Step S2, the data analyzing unit 182 functions. The data analyzing unit 182 analyzes "Atmospheric pressure" first. The data analyzing unit 182 calculates an amount of change in atmospheric pressure per unit time, and refers to a first threshold and a second threshold of atmospheric pressure from the threshold database 191. When the amount of change is less than the first threshold, a determination value scoring 0 points (having no influence, ○) is given, and the processing shifts to Step S3. When the amount of change is not less than the first threshold and less than the second threshold, a determination value scoring 1 point (having an influence, Δ) is given, and the processing shifts to Step S3. When the amount of change is not less than the second threshold, a determination value scoring 2 points (having a strong influence, ×) is given, and the processing shifts to Step S7. When there is a time during which the amount of change is not less than the threshold, the data analyzing unit 182 records information on the time as well, and the processing shifts to the next step.

When the processing shifts to Step S3, the data analyzing unit 182 analyzes "Repeatability" next. The data analyzing unit 182 calculates an average value of repeatability per unit time, and refers to a first threshold and a second threshold of repeatability from the threshold database 191. When the average value is less than the first threshold, a determination value scoring 0 points (○) is given, and the processing shifts to Step S7. When the average value is not less than the first threshold and less than the second threshold, a determination value scoring 1 point (Δ) is given, and the processing shifts to Step S4. When the average value is not less than the second threshold, a determination value scoring 2 points (×) is given, and the processing shifts to Step S4. When there is a time during which an average value is not less than the threshold, the data analyzing unit 182 records information on the time as well. In addition, the data analyzing unit 182 also analyzes whether the average value is close to a specification value, and records the analysis result.

When the processing shifts to Step S4, the data analyzing unit 182 analyzes "Temperature" next. The data analyzing unit 182 calculates an amount of change in temperature per unit time, and refers to a first threshold and a second threshold of temperature from the threshold database 191. When the amount of change is less than the first threshold, a determination value scoring 0 points (○) is given, and the processing shifts to Step S5. When the amount of change is not less than the first threshold and less than the second threshold, a determination value scoring 1 point (Δ) is given, and the processing shifts to Step S7. When the amount of change is not less than the second threshold, a determination value scoring 2 points (×) is given, and the processing shifts to Step S7. When there is a time during which the amount of change is not less than the threshold, the data analyzing unit 182 records information on the time as well, and the processing shifts to the next step.

When the processing shifts to Step S5, the data analyzing unit 182 analyzes "Humidity" next. The data analyzing unit 182 calculates an amount of change in humidity per unit time, and refer to a first threshold and a second threshold of humidity from the threshold database 191. When the amount of change is less than the first threshold, a determination value scoring 0 points (○) is given, and the processing shifts to Step S6. When the amount of change is not less than the first threshold and less than the second threshold, a determination value scoring 1 point (Δ) is given, and the processing shifts to Step S7. When the amount of change is not less than the second threshold, a determination value scoring 2 points (×) is given, and the processing shifts to Step S7. When there is a time during which the amount of change is not less than the threshold, the data analyzing unit 182 records information on the time as well, and the processing shifts to the next step. "Temperature" and "Humidity" do not have particular order, and humidity may be analyzed prior to temperature.

When the processing shifts to Step S6, the data analyzing unit 182 analyzes "Zero-point" next. The data analyzing unit 182 calculates an amount of change in zero-point per unit time, and refers to a first threshold and a second threshold of zero-point from the threshold database 191. When the amount of change is less than the first threshold, a determination value scoring 0 points (○) is given, and the processing shifts to Step S7. When the amount of change is not less than the first threshold and less than the second threshold, a determination value scoring 1 point (Δ) is given, and the processing shifts to Step S7. When the amount of change is not less than the second threshold, a determination value scoring 2 points (×) is given, and the processing shifts to Step S7. When there is a time during which the amount of change is not less than the threshold, the data analyzing unit 182 records information on the time as well, and the processing shifts to the next step.

When the processing shifts to Step S7, the improvement proposing unit 183 functions. The improvement proposing unit 183 reads out improvement comments from the improvement proposal database 193 based on analysis results of the data analyzing unit 182, that is, the "Determination values," and displays the improvement comments on the display unit 11 or outputs the improvement comments to an external device through the output unit 12, and ends the installation environment analysis.

Here, in the installation environment analysis, analyzing "Atmospheric pressure" first is technically significant. When the atmospheric pressure greatly changes, a buoyancy to be applied to an object to be weighed changes, and an absolute value of a weighing result changes, therefore, weighing should not be performed. This determination can be made by analyzing an amount of change in atmospheric pressure per unit time, therefore, by determining the atmospheric pressure first, a computational load on the arithmetic processing unit 18 is reduced.

In the installation environment analysis, analyzing "Repeatability" next is technically significant. When the standard deviation falls within the specifications, weighing can be performed without problem regardless of whether or not the environmental data is good. Therefore, by determining the environmental data except for the atmospheric pressure after determination of repeatability, the load on the arithmetic processing unit 18 is reduced.

In the installation environment analysis, analyzing three elements of "Temperature," "Humidity," and "Zero-point" next, and further, analyzing "Temperature" and "Humidity" before analyzing "Zero-point" is technically significant. It is obvious that by analyzing these in this order, the influence of environmental factors at the time of determination of zero-point is small (determination value: 0 points), therefore, by analyzing a change in zero-point, the certainty that a cause for poor repeatability is power-on drift of the apparatus can be increased.

FIGS. 5A to 5H are display examples of analysis results obtained in the weighing apparatus 1.

Figure 5A:
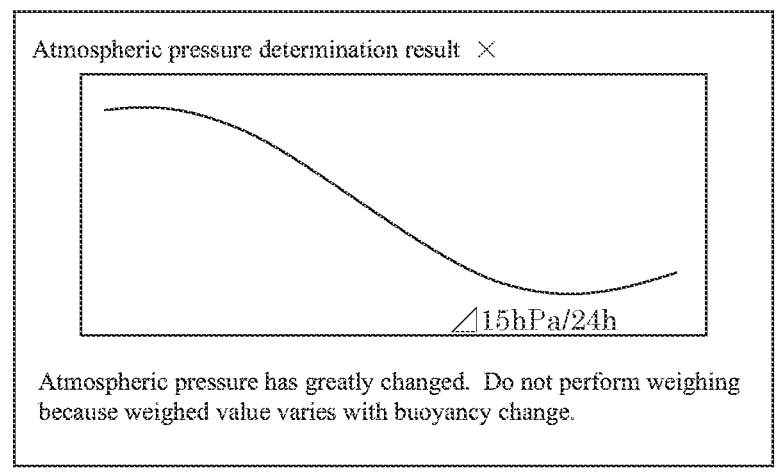
FIG. 5A is a display example of an analysis result obtained by the weighing apparatus.

FIG. 5A is a display example when the atmospheric pressure is given a determination value scoring 2 points (×) in Step S2. In this case, in Step S7, the improvement proposing unit 183 reads out a comment corresponding to the "Determination value scoring 2 points" of the "Atmospheric pressure" from the improvement proposal database 193, and displays the comment together with a temporal change graph of atmospheric pressure. It is also preferable that a numerical value of an amount of change is described in the graph.

Figure 5B:
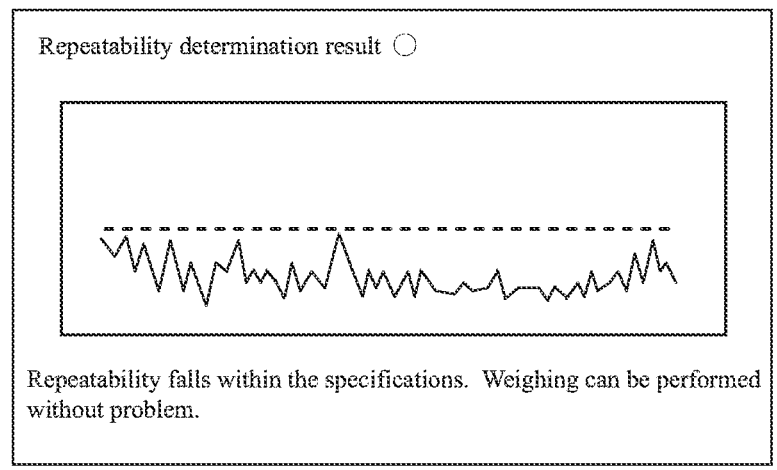
FIG. 5B is a display example of an analysis result obtained by the weighing apparatus.

FIG. 5B is a display example when repeatability is given a determination value scoring 0 points (○). In this case, in Step S7, the improvement proposing unit 183 reads out a comment corresponding to the "Determination value scoring 0 points" of the "Repeatability" from the improvement proposal database 193, and displays the comment together with a temporal change graph of repeatability. It is also preferable that a line (a dashed line in the figure) indicating a specification value is described in the graph.

Figure 5C:
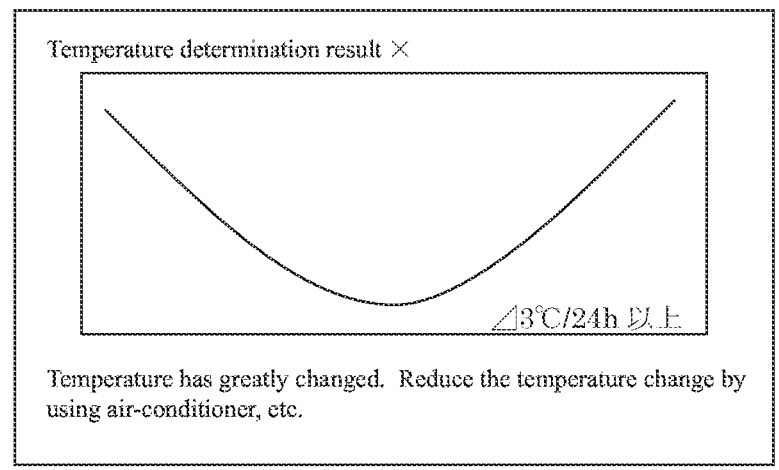
FIG. 5C is a display example of an analysis result obtained by the weighing apparatus.

FIG. 5C is a display example when the temperature is given a determination value scoring 2 points (×) in Step S4. In this case, in Step S7, the improvement proposing unit 183 reads out a comment corresponding to the "Determination value scoring 2 points" of the "Temperature" from the improvement proposal database 193, and displays the comment together with a temporal change graph of temperature. It is also preferable that a numerical value of an amount of change is described in the graph.

Figure 5D:
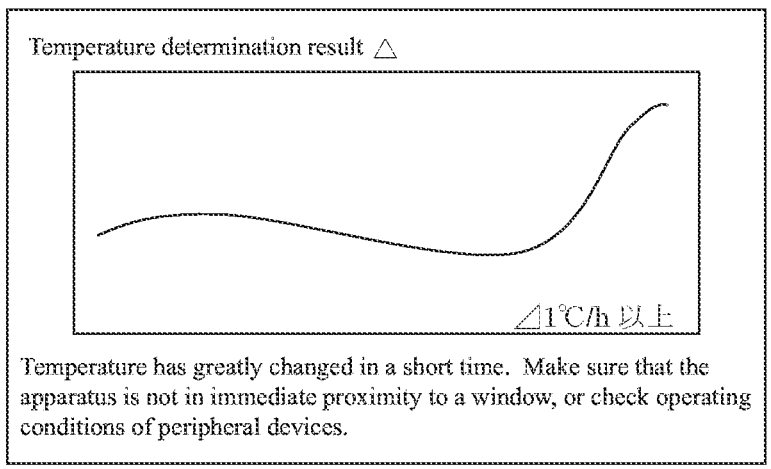
FIG. 5D is a display example of an analysis result obtained by the weighing apparatus.

FIG. 5D is a display example when the temperature is given a determination value scoring 1 point (Δ) and a time during which the temperature is not less than the first threshold is determined to be relatively short compared with the sampling time in Step S4. In this case, in Step S7, the improvement proposing unit 183 reads out a comment (1-2) from the "Table of temperature scoring 1 point" of the "Temperature" and displays the comment together with a temporal change graph of temperature. It is also preferable that a numerical value of an amount of change is described in the graph.

Figure 5E:
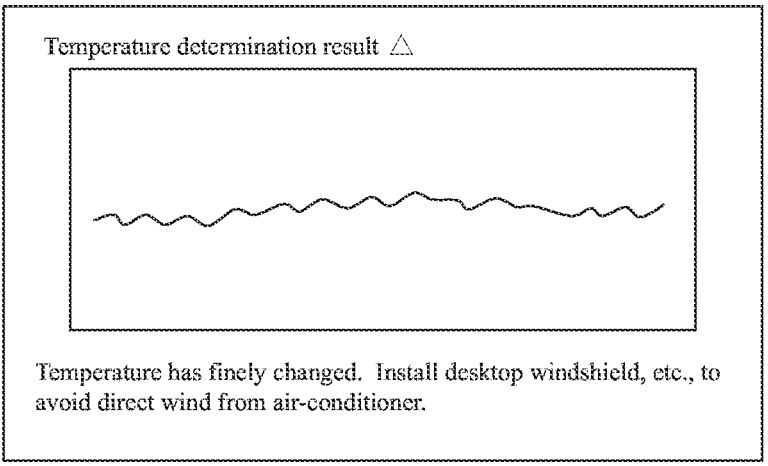
FIG. 5E is a display example of an analysis result obtained by the weighing apparatus.

FIG. 5E is a display example when the temperature is given a determination value scoring 1 point (Δ) and a time during which the temperature is not less than the first threshold is determined to intermittently appear in Step S4. In this case, in Step S7, the improvement proposing unit 183 reads out a comment (1-3) from the "Table of temperature scoring 1 point" of the "Temperature" and displays the comment together with a temporal change graph of temperature.

Figure 5F:
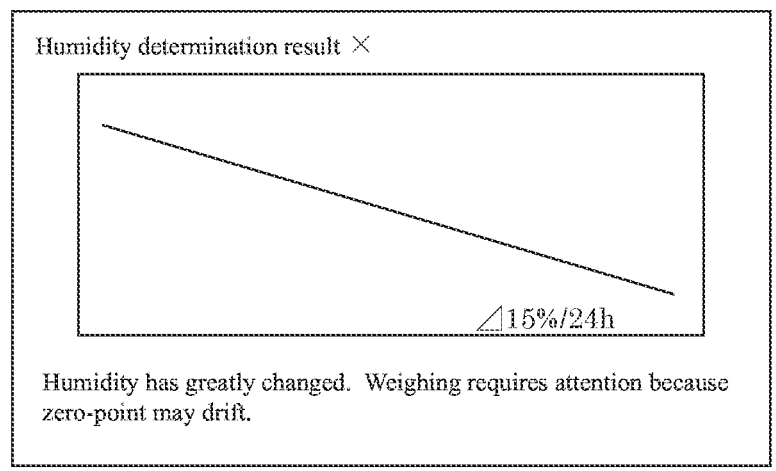
FIG. 5F is a display example of an analysis result obtained by the weighing apparatus.

FIG. 5F is a display example when the humidity is given a determination value scoring 2 points (×) in Step S5. In this case, in Step S7, the improvement proposing unit 183 reads out a comment corresponding to the "Determination value scoring 2 points" of the "Humidity" from the improvement proposal database 193, and displays the comment together with a temporal change graph of humidity. It is also preferable that a numerical value of an amount of change is described in the graph.

Figure 5G:
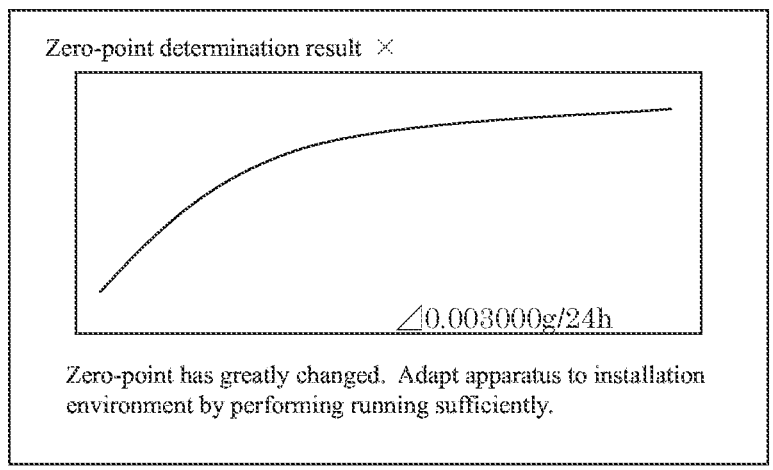
FIG. 5G is a display example of an analysis result obtained by the weighing apparatus.

FIG. 5G is a display example when zero-point is given a determination value scoring 2 points (×) in Step S6. In this case, in Step S7, the improvement proposing unit 183 reads out a comment corresponding to the "Determination value scoring 2 points" of the "Zero-point" from the improvement proposal database 193, and displays the comment together with a temporal change graph of zero-point. It is also preferable that a numerical value of an amount of change is described in the graph.

Figure 5H:
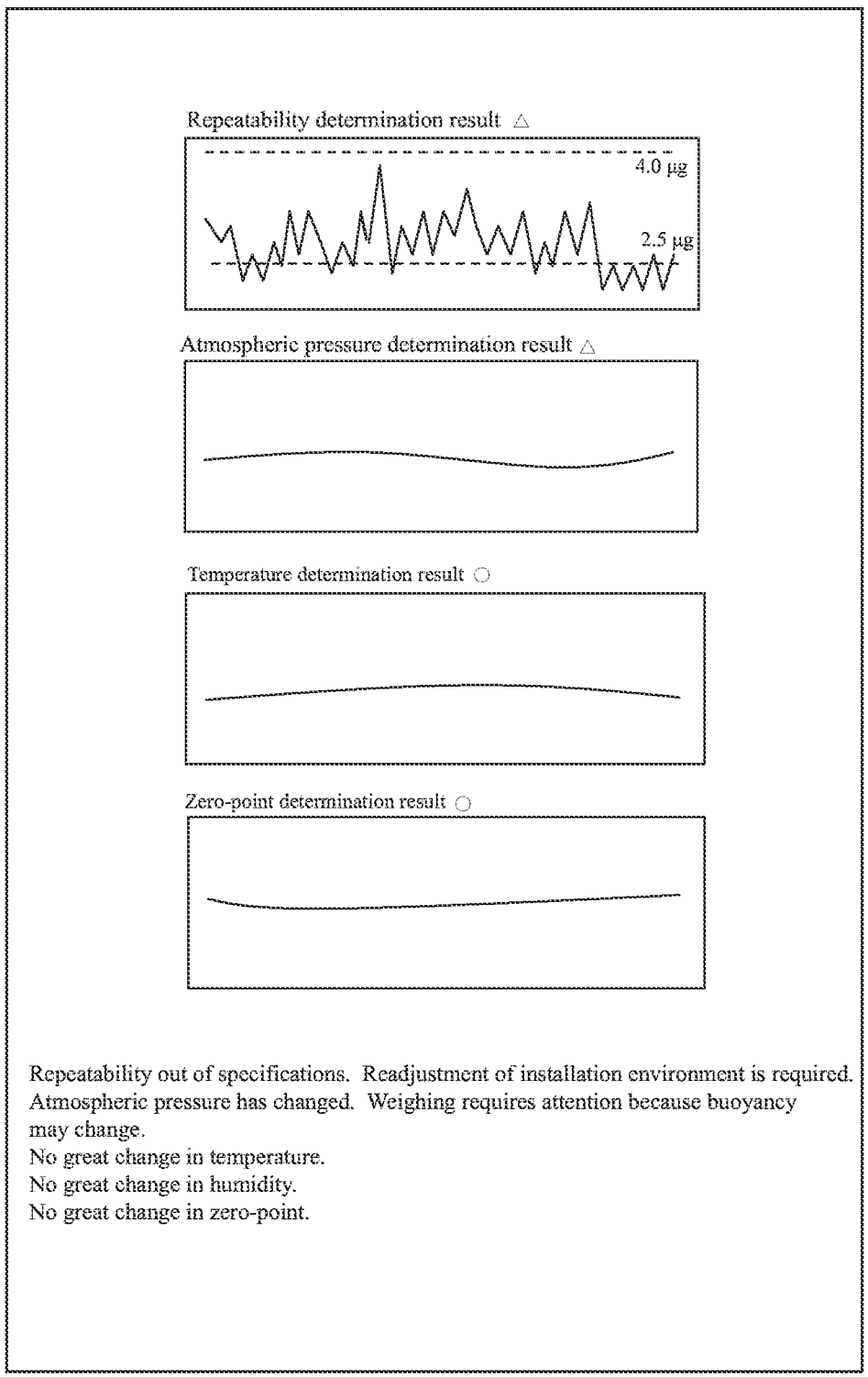
FIG. 5H is a display example of analysis results obtained by the weighing apparatus.

FIG. 5H is an example when the atmospheric pressure scores 1 point (Δ) in Step S2, the repeatability scores 1 point (Δ) in Step S3 (it cannot be said that the repeatability is close to a specification value, and a change in a short time is not detected), the temperature scores 0 points (○) in Step S4, the humidity scores 0 points (○) in Step S5, and the zero-point scores 0 points (○) in Step S6. In this case, in Step S7, from the improvement proposal database 193, the improvement proposing unit 183 reads out a comment (1-3) from the "Table of repeatability scoring 1 point" of the "Repeatability," and comments corresponding to the respective "Determination values" of "Atmospheric pressure," "Temperature," "Humidity," and "Zero-point," and displays the comment group together with temporal change graphs of the respective parameters.

As described above, the weighing apparatus 1 of the present embodiment automatically analyzes an installation environment, and presents a detailed improvement proposal.

Second Embodiment

Figure 6:
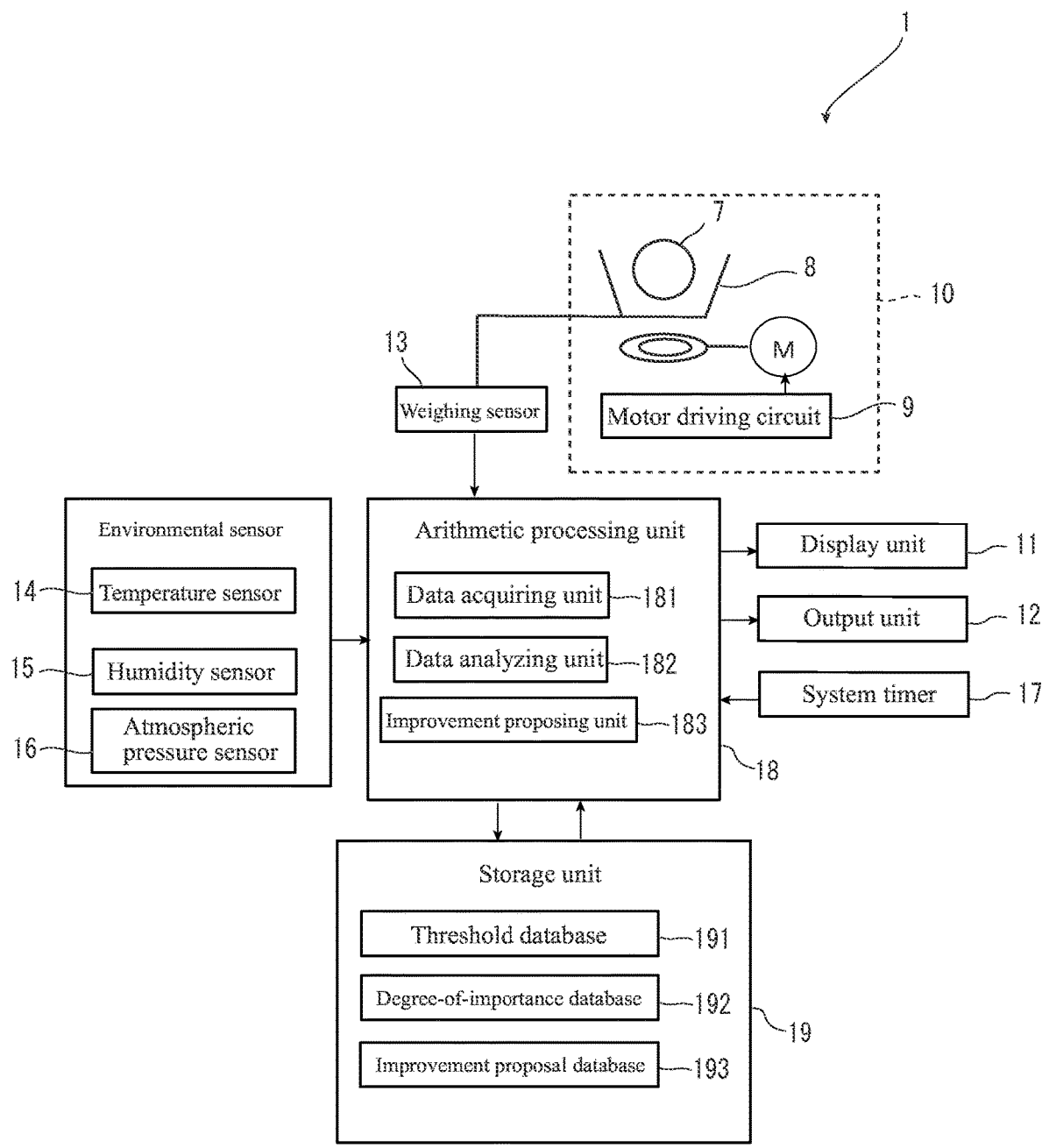
FIG. 6 is a configuration block diagram of a weighing apparatus according to a second embodiment of the present invention.

FIG. 6 is a configuration block diagram of a weighing apparatus 1 according to a second embodiment. The weighing apparatus 1 of the present embodiment performs "Weighting" in the installation environment analysis. The same components as in the first embodiment are provided with the same reference signs and descriptions thereof are omitted.

The weighing apparatus 1 of the present embodiment includes a built-in balance weight adding/removing unit 10, a display unit 11, an output unit 12, a weighing sensor 13, a temperature sensor 14, a humidity sensor 15, an atmospheric pressure sensor 16, a system timer 17, an arithmetic processing unit 18, and a storage unit 19.

The arithmetic processing unit 18 includes a data acquiring unit 181, a data analyzing unit 182, and an improvement proposing unit 183. The storage unit 19 includes a threshold database 191, an improvement proposal database 193, and further, for weighting, a degree-of-importance database 192.

According to the type of the weighing apparatus 1, the degree-of-importance database 192 stores "Degrees of importance (points)" for temperature, humidity, atmospheric pressure, and zero-point. The degree of importance is determined in consideration of at least "Minimum display" of the weighing apparatus 1 and "Characteristics" of the weighing apparatus 1. The "Minimum display" is accuracy (0.1 mg, 10 μm, 1 μm, etc.) of reading a weighed value of the weighing apparatus 1. The "Characteristics" are a material of the weighing sensor 13 (temperature/humidity sensitivity of sensor components) used in the weighing apparatus 1 and a heat transfer path (a case structure of the balance which houses the sensor) to the weighing sensor 13. The degrees of importance are determined in advance by a technical expert for each type of the apparatus by relative evaluation in consideration of the "Minimum display" and the "Characteristics."

FIG. 7 is an example of the degree-of-importance database 192 used in the weighing apparatus 1. There are three kinds of minimum displays of 0.1 mg, 10 μg, and 1 μg for "Balance A." In the balance A, the degree of importance of temperature is set so as to become higher as the minimum display becomes finer. "Balance B" has a minimum display of 0.1 mg, and has a weighing sensor higher in temperature sensitivity than the balance A, the degree of importance of temperature is therefore set to be higher than in the case of the minimum display of 0.1 mg of the balance A. "Balance C" has a case structure higher in air tightness than in the case of the minimum display of 0.1 mg of the balance A, the degree of importance of humidity is therefore set to be higher than in the case of the minimum display of 0.1 mg of the balance A. Setting of the degrees of importance is not limited to this example.

The data analyzing unit 182 in the present embodiment obtains "Determination values," reads out "Degrees of importance" of temperature, humidity, atmospheric pressure, and zero-point with reference to the degree-of-importance database 192, and performs "Scoring" based on the "Determination values" and the "Degrees of importance." Then, the data analyzing unit 182 determines that the higher score a parameter is given, the higher influence the parameter has on the weighing apparatus 1.

The improvement proposing unit 183 in the present embodiment reads out improvement comments in association with the determination values with reference to the improvement proposal database 193, and displays the comments on the display unit 11. At this time, a repeatability analysis result (determination value) is always displayed together with the improvement comments. Analysis results (determination values) of the parameters other than the repeatability are displayed in descending order of score.

Figure 8:
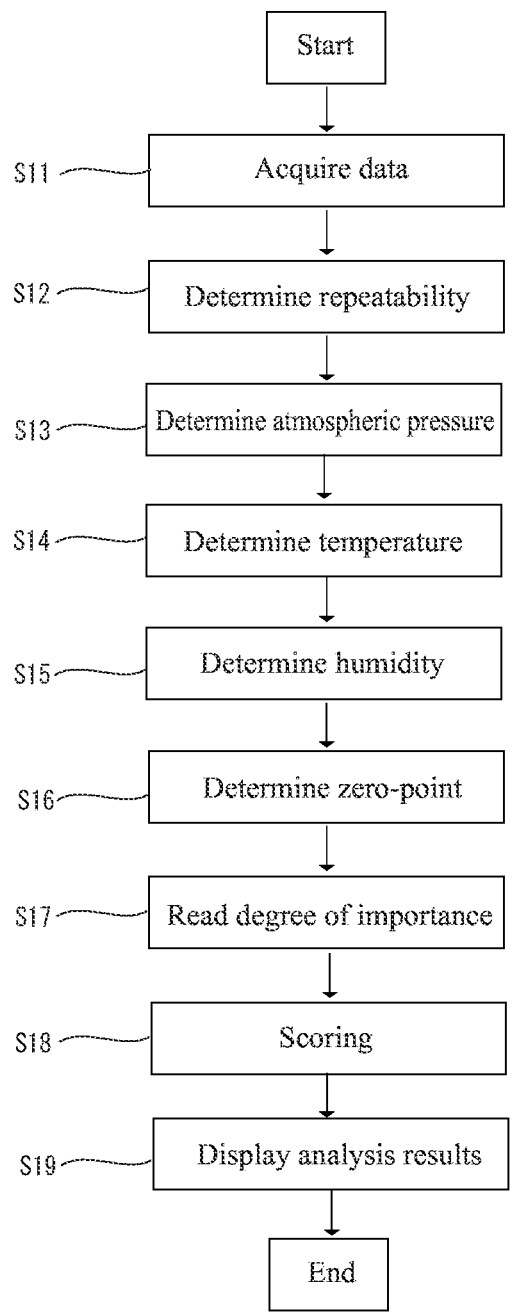
FIG. 8 is a flowchart of an installation environment analysis by the weighing apparatus.

By using the configuration described above, the weighing apparatus 1 of the present embodiment performs an installation environment analysis as follows. FIG. 8 is a flowchart of an installation environment analysis by the weighing apparatus 1 of the present embodiment. For the same steps as in the first embodiment, the step numbers are quoted, and descriptions of the steps are omitted.

In the present embodiment, the temperature, humidity, atmospheric pressure, zero-point, and repeatability are determined in no particular order.

When the installation environment analysis is started, the processing shifts to Step S11, and as in Step S1, the data acquiring unit 181 acquires and records weighed data (a weighed value, a zero-point, a span value, and a standard deviation of the span value) of the built-in balance weight 7 and environmental data (an atmospheric temperature, a humidity, and an atmospheric pressure). When sampling is finished, the processing shifts to Step S12.

When the processing shifts to Step S12, the data analyzing unit 182 functions. The data analyzing unit 182 gives a determination value to the repeatability with reference to a plurality of thresholds related to repeatability from the threshold database 191. When there is a time during which an average value is not less than the threshold, the data analyzing unit 182 records information on the time as well. In addition, the data analyzing unit 182 also analyzes whether the average value is close to a specification value, and records the analysis result.

Next, the processing shifts to Step S13, and the data analyzing unit 182 gives a determination value to the atmospheric pressure with reference to a plurality of thresholds related to atmospheric pressure from the threshold database 191. When there is a time during which the amount of change is not less than the threshold, the data analyzing unit 182 records information on the time as well, and the processing shifts to the next step.

Next, the processing shifts to Step S14, and the data analyzing unit 182 gives a determination value to the temperature with reference to a plurality of thresholds related to temperature from the threshold database 191. When there is a time during which the amount of change is not less than the threshold, the data analyzing unit 182 records information on the time as well, and the processing shifts to the next step.

Next, the processing shifts to Step S15, and the data analyzing unit 182 gives a determination value to the humidity with reference to a plurality of thresholds related to humidity from the threshold database 191. When there is a time during which the amount of change is not less than the threshold, the data analyzing unit 182 records information on the time as well, and the processing shifts to the next step.

Next, the processing shifts to Step S16, and the data analyzing unit 182 gives a determination value to the zero-point with reference to a plurality of thresholds related to zero-point from the threshold database 191. When there is a time during which the amount of change is not less than the threshold, the data analyzing unit 182 records information on the time as well, and the processing shifts to the next step.

Next, the processing shifts to Step S17, and the data analyzing unit 182 reads degrees of importance of temperature, humidity, atmospheric pressure, and zero-point with regard to the weighing apparatus 1 with reference to the degree-of-importance database 192.

Next, the processing shifts to Step S18, and the data analyzing unit 182 scores the temperature, humidity, atmospheric pressure, and zero-point. Scoring is preferably performed by multiplying a determination value by a degree of importance, or by summing a determination value and a degree of importance.

Next, the processing shifts to Step S19, and the improvement proposing unit 183 functions. The improvement proposing unit 183 reads out improvement comments from the improvement proposal database 193 based on the determination values determined by the data analyzing unit 182, and displays the comments on the display unit 11, or outputs the comments to an external device through the output unit 12, and then ends the installation environment analysis. At this time, the improvement proposing unit 183 displays the comments in descending order of score determined in Step S18. This will be described later.

Example

Figure 9:
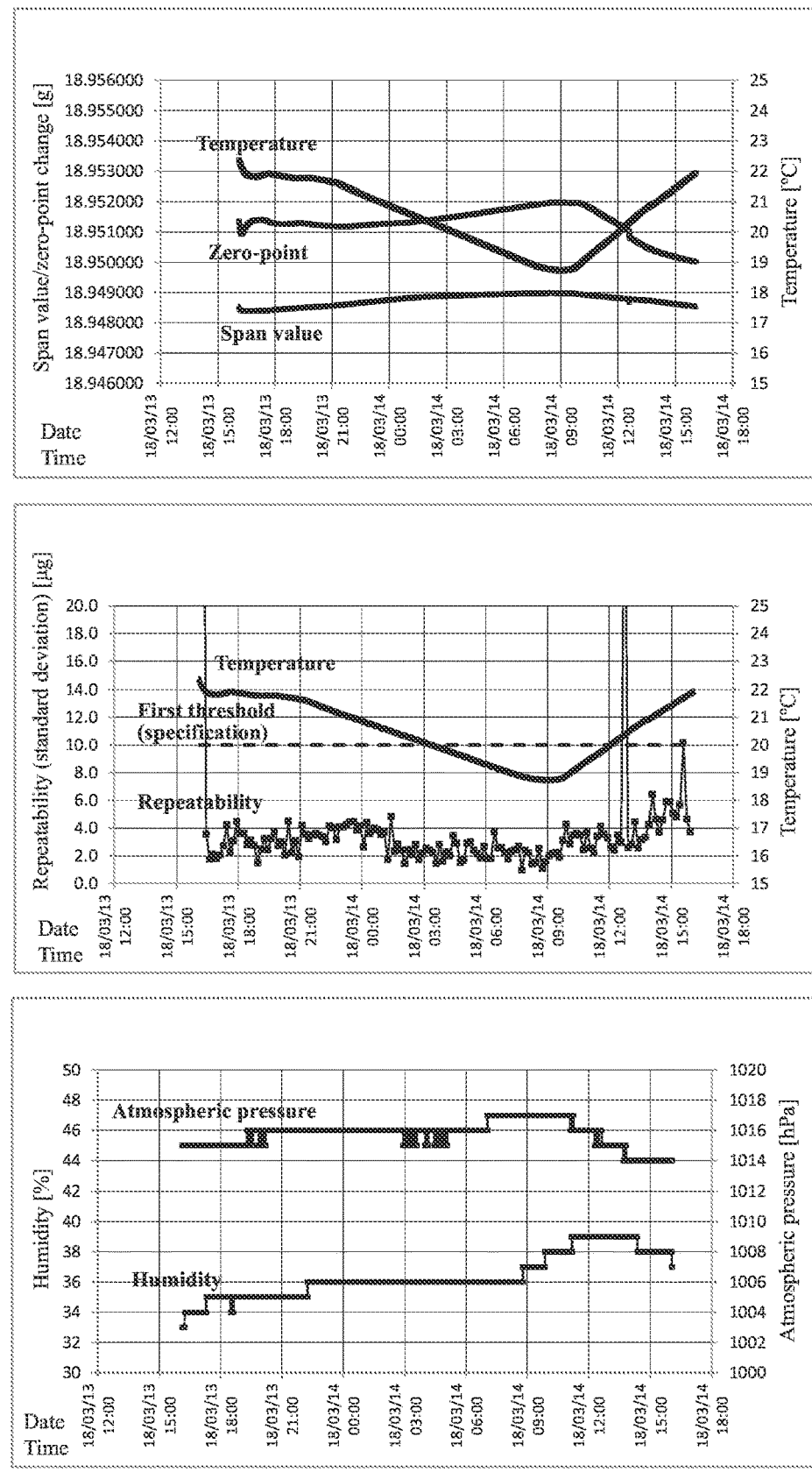
FIG. 9 is an example of data to be acquired by the weighing apparatus.

FIG. 9 is temporal change graphs of weighed data and environmental data sampled in an example. An example of scoring of these sampling data is given.

For the balance D of the example, the sampling time was 24 hours, and weighed data and environmental data were acquired once per minute. As the degrees of importance of the balance D, in consideration of relatively high temperature sensitivity and a minimum display of 1 μg of the weighing sensor, the degree of importance of atmospheric pressure was set to 2 points, the degree of importance of temperature was set to 3 points, the degree of importance of humidity was set to 1 point, and the degree of importance of zero-point was set to 1 point. As thresholds of the balance D, the values in FIG. 2 were used. Determination values of the balance D were set to 0 points when the parameter was less than the first threshold, 1 point when the parameter was not less than the first threshold and less than the second threshold, and 2 points when the parameter was not less than the second threshold.

The determination values were given as follows.
Atmospheric pressure: 1014 [hPa] to 1017 [hPa], amount of change in atmospheric pressure: 3 [hPa/24 h], determination value: 0 points
Temperature: 18.71 [° C.] to 22.36 [° C.], amount of change in temperature: 1.3 [° C./h], determination value: 1 point
Humidity: 33 [%] to 39 [%], amount of change in humidity: 6 [%/24 h], determination value: point
Zero-point: −0.001657 [g] to 0.000305 [g], amount of change in zero-point: 0.001962 [g/24 h], determination value: 1 point
Repeatability: 0.95 [μg] to 46.4 [μg], average per 24 hours: 3.4 [μg], determination value: 1 point Scoring was performed by multiplying the determination value by the degree of importance.
Atmospheric pressure: 0×2=0, Score: 0 points
Temperature: 1×3=3, Score: 3 points
Humidity: 1×1=1, Score: 1 point
Zero-point: 1×1=1, Score: 1 point Therefore, as parameters having a high degree of influence on the balance D, the temperature was determined as a parameter having the highest degree of influence, and the humidity and the zero-point were determined as parameters having the second highest degree of influence.

Figure 10A:
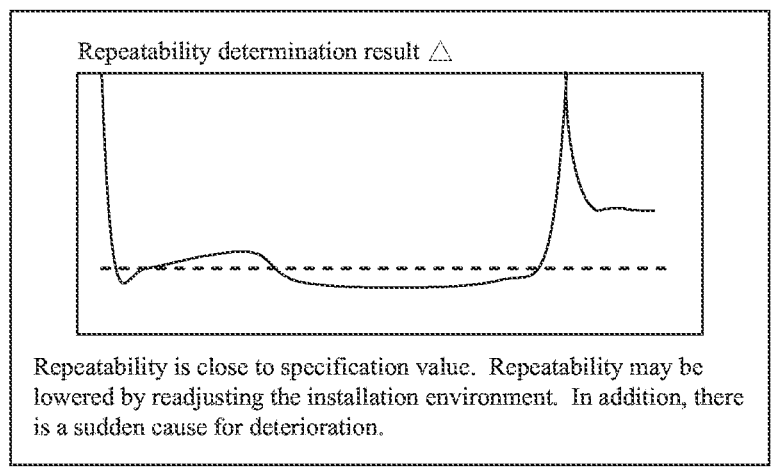
FIG. 10A is a display example of an analysis result obtained by the weighing apparatus.
Figure 10B:
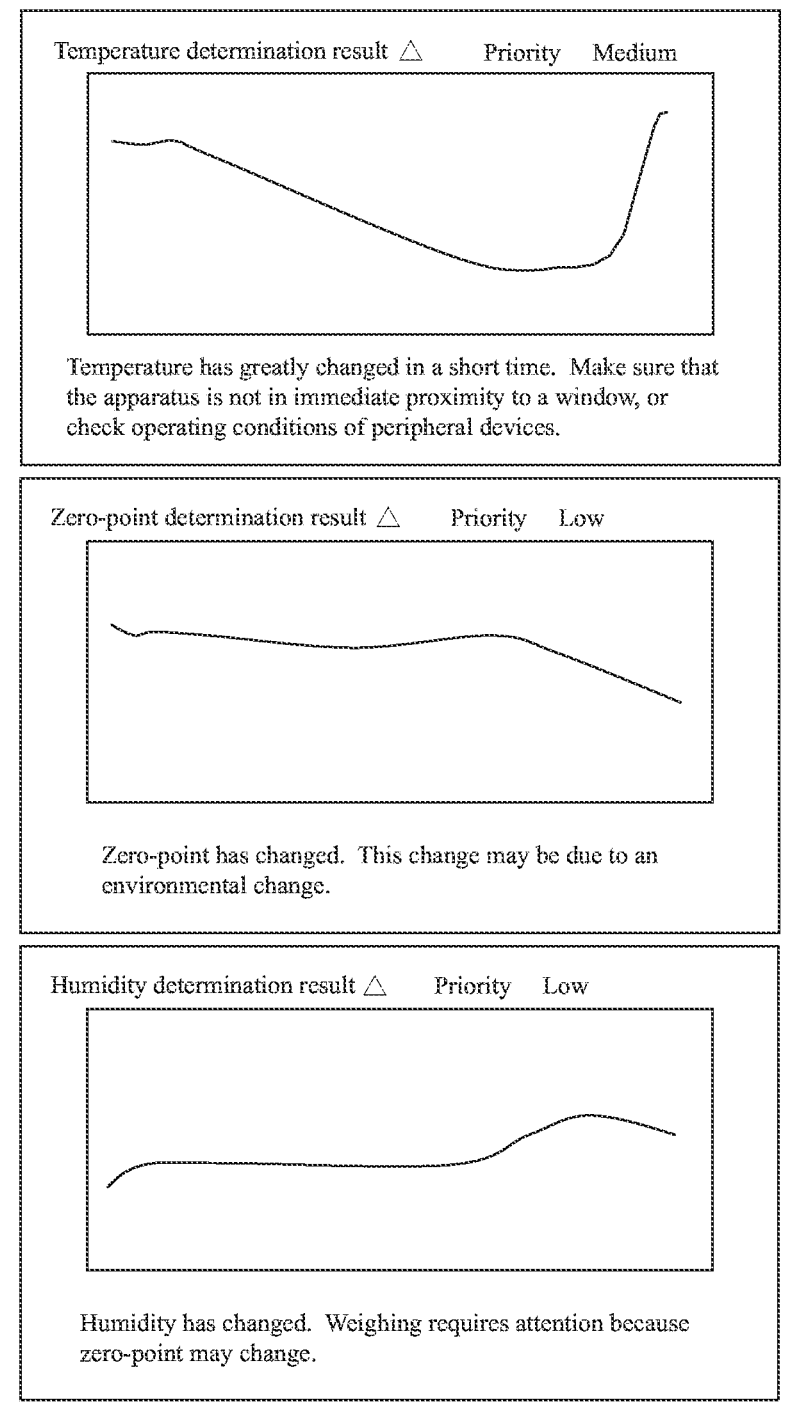
FIG. 10B is a display example of analysis results obtained by the weighing apparatus.

FIGS. 10A and 10B are display examples of analysis results in the example illustrated in FIG. 9.

As illustrated in FIG. 10A, the improvement proposing unit 183 displays analysis results of the repeatability first. The determination value of the repeatability scores 1 point (Δ), and an average value is 3.5 μm and close to a specification value, and there was a relatively short time during which repeatability was not less than the first threshold compared with the sampling time, therefore, the improvement proposing unit 183 selects a comment (1-2) in the "Table of repeatability scoring 1 point" from the improvement proposal database 193, and displays this comment together with a temporal change graph of repeatability.

Next, as illustrated in FIG. 10B, the improvement proposing unit 183 displays at least two kinds of parameters having a high degree of influence on the balance D in descending order of score. At this time, it is also preferable that information based on scoring is displayed. Information based on scoring may be converted into a rank expression, a symbol, or a character that enables a user to easily understand the scored points or scoring results. In FIG. 10B, as an example, a priority order is illustrated according to the scored points, and the priority order is expressed as a score of 1 to 2 points: "Low," a score of 3 to 4 points: "Medium," and a score of 5 points or more: "High."

The improvement proposing unit 183 displays the temperature at the top and displays the priority as "Medium" because the score of the temperature is "3 points" and highest. In addition, there was a relatively short time during which the temperature was not less than the first threshold, therefore, the improvement proposing unit 183 reads out a comment (1-2) from the "Table of temperature scoring 1 point" of the improvement proposal database 193, and displays the comment together with a temporal change graph of temperature.

Scores of the humidity and the zero-point were "1 point" and are tied for the second place, therefore, the improvement proposing unit 183 displays these below the temperature, and displays the priority as "Low". Then, the improvement proposing unit 183 reads out a comment of "Determination value scoring 1 point" of humidity from the improvement proposal database 193, and displays the comment together with a temporal change graph of humidity. Then, the improvement proposing unit 183 reads out a comment of "Determination value scoring 1 point" of the zero-point, and displays the comment together with a temporal change graph of zero-point.

As described above, the weighing apparatus 1 of the present embodiment automatically analyzes the installation environment, and after weighting parameters having a high degree of influence on the weighing apparatus 1, presents a detailed improvement proposal. Therefore, an appropriate determination can be made for each type of the apparatus.

Third Embodiment

Figure 11:
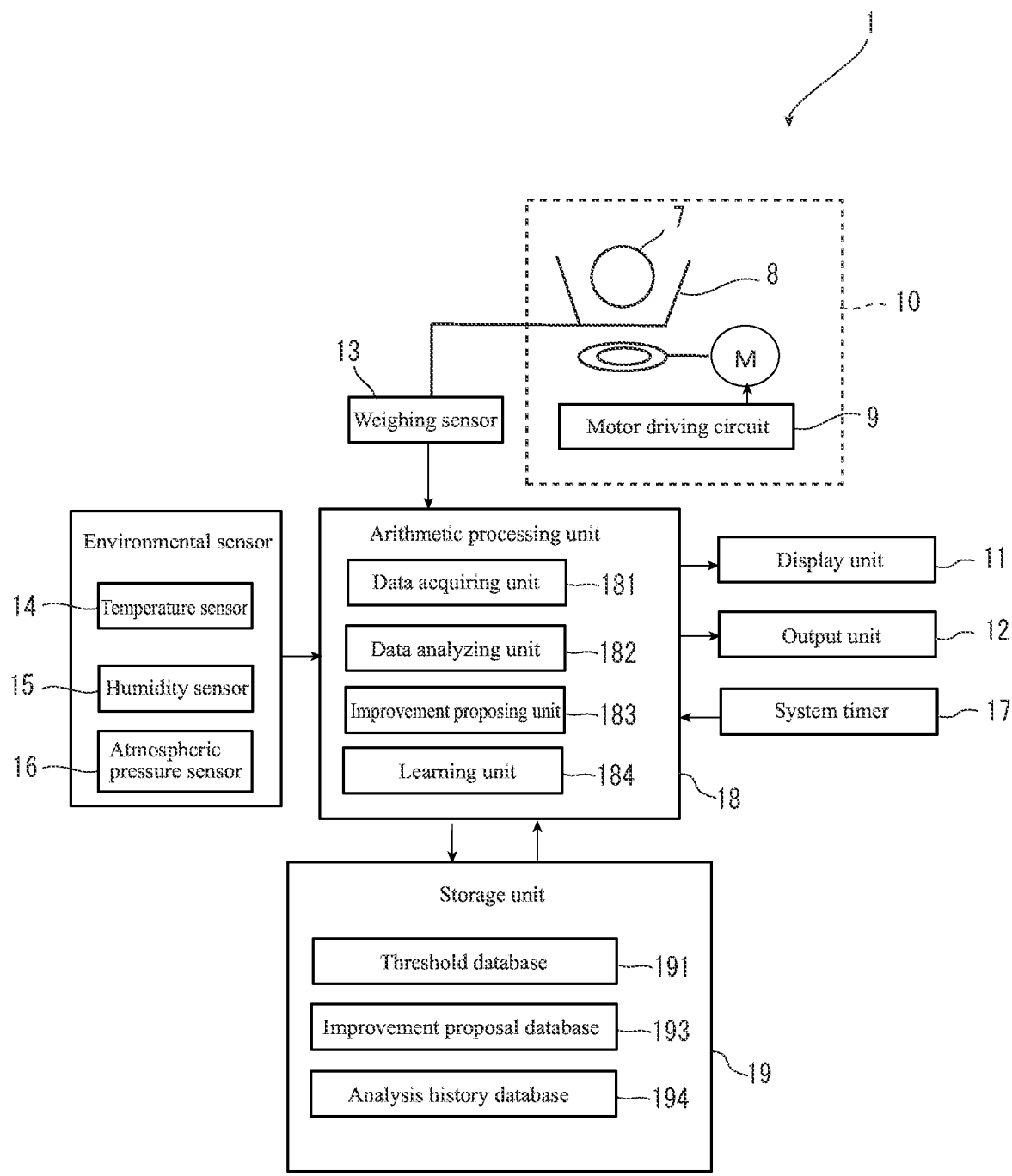
FIG. 11 is a configuration block diagram of a weighing apparatus according to a third embodiment of the present invention.

FIG. 11 is a configuration block diagram of a weighing apparatus 1 according to a third embodiment. The weighing apparatus 1 according to the third embodiment performs "Learning" in the installation environment analysis in the first embodiment. The same components as in the first embodiment are provided with the same reference signs and descriptions thereof are omitted.

The weighing apparatus 1 of the present embodiment includes a built-in balance weight adding/removing unit 10, a display unit 11, an output unit 12, a weighing sensor 13, a temperature sensor 14, a humidity sensor 15, an atmospheric pressure sensor 16, a system timer 17, an arithmetic processing unit 18, and a storage unit 19.

The arithmetic processing unit 18 includes a data acquiring unit 181, a data analyzing unit 182, an improvement proposing unit 183, and further, a learning unit 184. The storage unit 19 includes a threshold database 191, an improvement proposal database 193, and further, for learning, an analysis history database 194.

In the analysis history database 194, each time an analysis is made, weighed data and environmental data, amounts of change of the data, average values of the data, and determination values, used for the analysis by the data analyzing unit 182, are recorded. That is, in the analysis history database 194, past analyses are accumulated.

The learning unit 184 performs "Comparative analysis" by comparing one of past analyses with the latest analysis, and "Learning analysis" by comparing an analysis obtained through learning with the latest analysis.

For the "Comparative analysis," when a designation is given from a user, a past analysis at such designated time is used. When no designation is given from a user, from past analyses recorded in the analysis history database 194, an analysis made under similar conditions and having good determination values is extracted by considering the day of the week and the date and time as well. Between the latest analysis and the past analysis, the learning unit 184 checks a difference in average value for repeatability, and checks differences in amount of change for temperature, humidity, atmospheric pressure, and zero-point. The data analyzing unit 182 determines "Deteriorated (the difference increased)/Improved (the difference decreased)" according to amounts of the differences.

As "Learning analysis," temporal changes of each data group of temperature, humidity, atmospheric pressure, zero-point, and repeatability accumulated in the analysis history database 194 are learned. The learning unit 184 creates approximate curves of the temporal change graphs of the latest analysis and the learning analysis, and searches for a correlation coefficient. The data analyzing unit 182 determines "Deteriorated (different from normal)/Good (normal)" according to a magnitude of an absolute value of the correlation coefficient.

In the improvement proposal database 193 of the present embodiment, improvement comments for "Comparative analysis" and improvement comments for "Learning analysis" are stored. FIGS. 12A and 12B are examples of the improvement proposal database 193 to be used in the weighing apparatus 1 of the present embodiment. FIG. 12A is an example of "Comparative analysis," and FIG. 12B is an example of "Learning analysis." In FIG. 12A, comments different between the case of "Deteriorated" and the case of "Improved" in comparison with the past analysis are prepared for each parameter. In FIG. 12B, comments different between the case of "Deteriorated" and the case of "Good" in comparison with a learning model are prepared for each parameter.

The improvement proposing unit 183 in the present embodiment reads out improvement comments with reference to the improvement proposal database 193 based on the determination made by the learning unit 184, and displays the comments on the display unit 11, etc.

Figure 13:
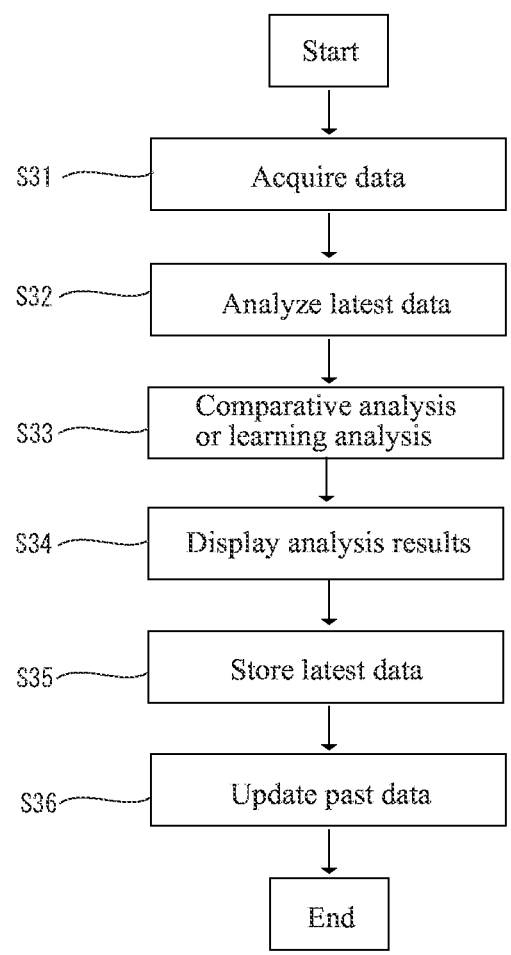
FIG. 13 is a flowchart of an installation environment by the weighing apparatus.

By using the configuration described above, the weighing apparatus 1 of the present embodiment performs an installation environment analysis as follows. FIG. 13 is a flowchart of an installation environment analysis by the weighing apparatus 1 of the present embodiment. For the same steps as in the first embodiment, the step numbers are quoted, and descriptions of the steps are omitted.

When the installation environment analysis is started, the processing shifts to Step S31, and the data acquiring unit 181 functions. As in Step S1, the data acquiring unit 181 acquires and records weighed data (a weighed value, a zero-point, a span value, and a standard deviation of the span value) of the built-in balance weight 7 and environmental data (an atmospheric temperature, a humidity, and an atmospheric pressure). When sampling is finished, the processing shifts to Step S32.

When the processing shifts to Step S32, the data analyzing unit 182 functions. The data analyzing unit 182 performs the processes of Steps S1 to S6 to make an analysis.

Next, when the processing shifts to Step S33, the learning unit 184 functions. When performing "Comparative analysis," with reference to one of past analyses from the analysis history database 194, the learning unit 184 obtains differences in repeatability, temperature, humidity, atmospheric pressure, and zero-point and determines whether these parameters have deteriorated or improved. When performing "Learning analysis," the learning unit 184 refers to an analysis obtained through learning from the analysis history database 194, and by calculating correlation coefficients of the repeatability, temperature, humidity, atmospheric pressure, and zero-point, and determines whether these parameters have deteriorated or are good.

Next, the processing shifts to Step S34, and the improvement proposing unit 183 functions. The improvement proposing unit 183 reads out improvement comments from the improvement proposal database 193 based on the determination made by the learning unit 184, and displays the comments on the display unit 11 or outputs the comments to an external device through the output unit 12.

Next, the processing shifts to Step S35, and the learning unit 184 stores the weighed data and the environmental data, the amounts of changes in temperature, humidity, atmospheric pressure, and zero-point, an average value of the repeatability, and determination values of the respective parameters of the latest analysis, in the analysis history database 194.

Next, the processing shifts to Step S36, and the learning unit 184 updates learning including the latest data, and ends the installation environment analysis.

Figure 15:
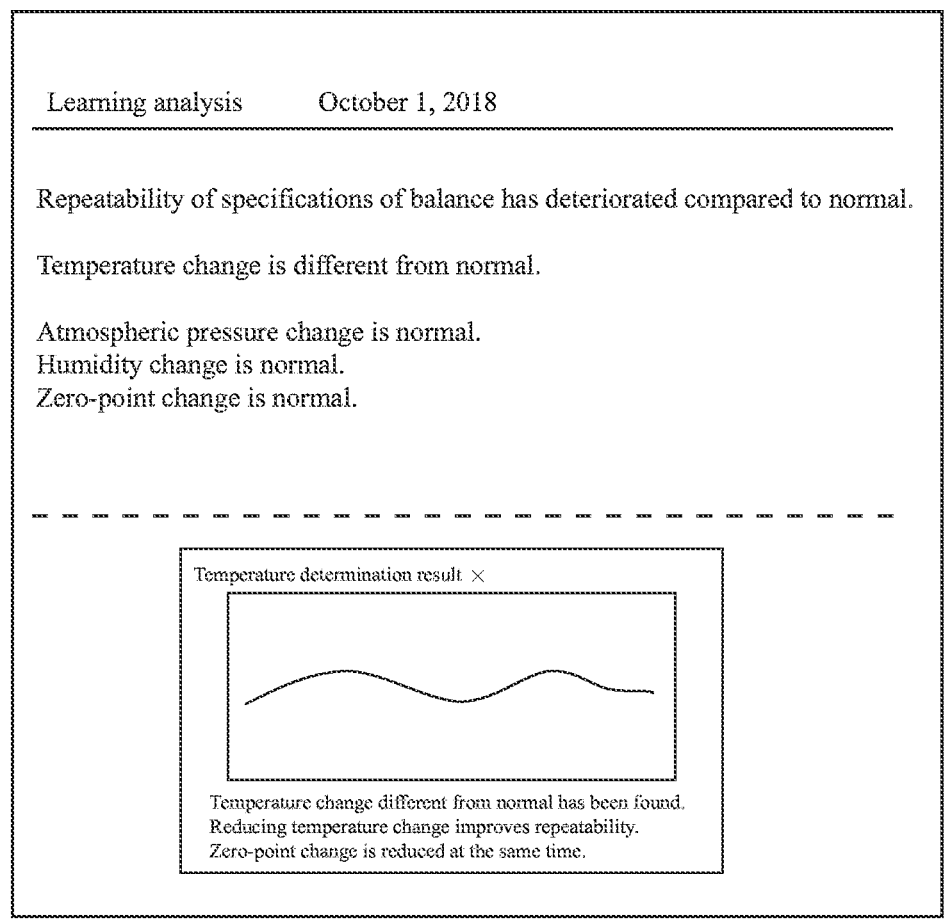
FIG. 15 is a display example of analysis results obtained by the weighing apparatus.

FIGS. 14 and 15 are display examples of analysis results obtained in the weighing apparatus 1 of the present embodiment. FIG. 14 is an example of "Comparative analysis." FIG. 15 is an example of "Learning analysis."

In the case of "Comparative analysis," first, the improvement proposing unit 183 displays "Repeatability" in the form of a graph for comparison as illustrated in (i) of FIG. 14. In FIG. 14, in the latest analysis, the determination value of repeatability scores 1 point (A), and an average value is close to a specification value, and there was a relatively short time during which repeatability was not less than the first threshold compared with the sampling time, therefore, the improvement proposing unit 183 selects a comment (1-2) from the "Table of repeatability scoring 1 point" of the improvement proposal database 193, and displays the comment together with a temporal change graph of repeatability.

Subsequently, as illustrated in (ii) of FIG. 14, the improvement proposing unit 183 switches the display, and extracts an analysis made under similar conditions of the day of the week and time and having a good determination value (determination value scoring 0 points) of repeatability from past analyses, and displays this for comparison.

Subsequently, as illustrated in (iii) of FIG. 14, the improvement proposing unit 183 switches the display, and displays an average value of repeatability and amounts of changes in temperature, humidity, atmospheric pressure, and zero-point in the form of numerical values for comparison.

Subsequently, as illustrated in (iv) of FIG. 14, the improvement proposing unit 183 switches the display, and displays a comparative analysis of each of the parameters of repeatability, temperature, humidity, atmospheric pressure, and zero-point. The improvement proposing unit 183 directly displays the determinations of the parameters made by the learning unit 184, that is, the determinations of deteriorated (difference increased) or improved (difference decreased) to inform the fact (the section above the dashed line). Then, the improvement proposing unit 183 reads out improvement comments (the section below the dashed line) based on the determinations of the learning unit 184 from the improvement proposal database 193. In the example illustrated in FIG. 14, the temperature change is determined to have "Increased," therefore, concerning "Temperature," a comment of "Deteriorated" is read out.

In the case of the "Learning analysis," as illustrated in FIG. 15, the improvement proposing unit 183 directly displays the determinations on the parameters made by the learning unit 184, that is, the determinations of deteriorated (different from normal) or good (normal) to inform the fact (the section above the dashed line). Then, the improvement proposing unit 183 reads out improvement comments (the section below the dashed line) based on the determinations of the learning unit 184 from the improvement proposal database 193. In FIG. 15, the absolute value of the correlation coefficient of the amount of change in temperature is small, therefore, concerning "Temperature," a comment of "Deteriorated" is read out.

As described above, the weighing apparatus 1 of the present embodiment automatically analyzes the installation environment, and after comparing the analysis with past arbitrary data, presents a detailed improvement proposal. Therefore, how the apparatus that a user uses and the apparatus environment have changed compared with a past environment can be shown and an improvement proposal for that can be presented. In addition, upon learning of past accumulated data, the weighing apparatus 1 of the present embodiment presents a detailed improvement proposal. Therefore, with an increase in the stored data, it becomes possible to determine whether changes in weighed data and environmental data are regular ones or sudden ones, and analysis accuracy can be improved.

Modification

The third embodiment can also be modified by being combined with the second embodiment. In this modification, the weighing apparatus 1 includes a built-in balance weight adding/removing unit 10, a display unit 11, an output unit 12, a weighing sensor 13, a temperature sensor 14, a humidity sensor 15, an atmospheric pressure sensor 16, a system timer 17, an arithmetic processing unit 18, and a storage unit 19, the arithmetic processing unit 18 includes a data acquiring unit 181, a data analyzing unit 182, an improvement proposing unit 183, and a learning unit 184, and the storage unit 19 includes a threshold database 191, a degree-of-importance database 192, an improvement proposal database 193, and an analysis history database 194.

In the analysis history database 194, each time an analysis is made, degrees of importance and scores are also recorded. The learning unit 184 may use the scores for extraction conditions in the "Comparative analysis."

An installation environment analysis flowchart of the modification follows FIG. 13. For the same steps as in the second embodiment, the same step numbers are quoted, and descriptions of these are omitted.

When the installation environment analysis is started and the processing shifts to Step S32, the data analyzing unit 182 performs the processes of Steps S11 to S18 to make an analysis. Then, when learning is finished in Step S33, in Step S34, the improvement proposing unit 183 displays improvement comments concerning parameters given high scores by using determination values and degrees of importance in order. Then, in Step S35, the learning unit 184 also stores the degrees of importance and scores in the analysis history database 194, updates the learning model in Step S36, and ends the installation environment analysis.

Although embodiments and a modification of a preferred installation environment proposal method and a weighing apparatus for the same of the present invention have been described above, each of the embodiments and the modification can be combined based on the knowledge of a person skilled in the art, and such combined form is also included in the scope of the present invention.

REFERENCE SIGNS LIST

1 Weighing apparatus
7 Built-in balance weight (object to be weighed)
11 Display unit
12 Output unit
13 Weighing sensor
14 Temperature sensor (environmental sensor)
15 Humidity sensor (environmental sensor)
16 Atmospheric pressure sensor (environmental sensor)
17 System timer
18 Arithmetic processing unit
181 Data acquiring unit
182 Data analyzing unit
183 Improvement proposing unit
184 Learning unit
19 Storage unit
191 Threshold database
192 Degree-of-importance database
193 Improvement proposal database
194 Analysis history database

The invention claimed is:

1. An installation environment proposal method for a weighing apparatus, comprising:
(a) a step of acquiring, as weighed data of an object to be weighed, at least a weighed value, a zero-point, and a standard deviation of a span value from a weighing sensor together with time information;
(b) a step of acquiring, as environmental data, at least an atmospheric pressure, a temperature, and a humidity from an environmental sensor together with time information;
(c) a step of checking, with respect to the weighed data and the environmental data, whether an amount of change of the data per unit time or an average value of the data is less than or not less than a threshold with reference to a threshold database and obtaining a determination of influence on the weighing apparatus; and
(d) a step of making a proposal on an installation environment based on the determination of influence with reference to an improvement proposal database.

2. The installation environment proposal method according to claim 1, wherein
in the step (c), a plurality of the thresholds are set in stages, and in the determination, a determination value of one of the plurality of stages is given according to the thresholds, and
in the step (d), an improvement comment in association with the determination value and stored in the improvement proposal database is read out and a proposal on the installation environment is made.

3. The installation environment proposal method according to claim 1, further comprising:
(e) a step of storing an analysis in the step (c) in an analysis history database;

(f) a step of reading out one of past analyses or an analysis obtained through learning with reference to the analysis history database, and with respect to each of the weighed data and the environmental data, comparing the latest analysis with the past analysis or comparing the latest analysis with the analysis obtained through learning; and (g) a step of making a proposal on the installation environment by reading out an improvement comment contrasting the latest environment with a past environment according to results of the comparison with reference to the improvement proposal database.

4. The installation environment proposal method according to claim 1, wherein
in the step (c), the determination is made in order of
(i) atmospheric pressure,
(ii) standard deviation of span value,
(iii) temperature and humidity, and
(iv) zero-point.

5. The installation environment proposal method according to claim 1, wherein the proposal is displayed together with a temporal change graph of the weighed data and/or the environmental data related to the proposal.

6. An installation environment proposal method for a weighing apparatus, comprising:

(a) a step of acquiring, as weighed data of an object to be weighed, at least a weighed value, a zero-point, and a standard deviation of a span value from a weighing sensor together with time information;

(b) a step of acquiring, as environmental data, at least an atmospheric pressure, a temperature, and a humidity from an environmental sensor together with time information;

(c) a step of checking, with respect to each of the weighed data and the environmental data, whether an amount of change of the data per unit time or an average value of the data is less than or not less than a threshold with reference to a threshold database and giving a determination value of one of a plurality of stages;

(d) a step of reading degrees of importance set at least for the temperature, the humidity, the atmospheric pressure, and the zero-point in consideration of at least reading accuracy of the weighing apparatus and characteristics of the weighing apparatus with reference to a degree-of-importance database;

(e) a step of scoring based on the determination value and the degree of importance; and (f) a step of reading out an improvement comment in association with the determination value and stored in an improvement proposal database with reference to the improvement proposal database and making a proposal on an installation environment in descending order of the score.

7. The installation environment proposal method according to claim 6, wherein in the step (f), the improvement comment is displayed together with the determination value of the standard deviation.

8. The installation environment proposal method according to claim 6, wherein in the step (f), the improvement comment is displayed together with information based on the score.

9. The installation environment proposal method according to claim 6, further comprising:

(g) a step of storing an analysis in the step (c) in an analysis history database;

(h) a step of reading out one of past analyses or an analysis obtained through learning with reference to the analysis history database, and with respect to each of the weighed data and the environmental data, comparing the latest analysis with the past analysis or comparing the latest analysis with the analysis obtained through learning; and (i) a step of making a proposal on the installation environment by reading out an improvement comment contrasting the latest environment with a past environment according to results of the comparison with reference to the improvement proposal database.

10. The installation environment proposal method according to claim 6, wherein the proposal is displayed together with a temporal change graph of the weighed data and/or the environmental data related to the proposal.

11. A weighing apparatus comprising:
a weighing sensor configured to detect weighed data of an object to be weighed;
an environmental sensor configured to detect environmental data of an installation environment;
a system timer for obtaining detection times of the weighed data and the environmental data;
a storage unit configured to record the weighed data and the environmental data together with time information;
an arithmetic processing unit configured to analyze the weighed data and the environmental data; and
a display unit configured to display analysis results of the arithmetic processing unit and/or an output unit configured to output the analysis results to an external device, wherein
the storage unit includes a threshold database storing a plurality of thresholds set in stages for each of the weighed data and the environmental data and an improvement proposal database storing improvement comments, and
the arithmetic processing unit checks, with respect to each of the weighed data and the environmental data, whether an amount of change of the data per unit time or an average value of the data is less than or not less than a threshold with reference to the threshold database, gives a determination value of one of the plurality of stages, reads out the improvement comment in association with the determination value with reference to the improvement proposal database, and makes a proposal on the installation environment.

12. The weighing apparatus according to claim 11, wherein
the storage unit further includes a degree-of-importance database storing degrees of importance set at least for the temperature, the humidity, the atmospheric pressure, and the zero-point in consideration of reading accuracy of the weighing apparatus and characteristics of the weighing apparatus, and
the arithmetic processing unit reads out the degree of importance from the degree-of-importance database, performs scoring based on the determination value and the degree of importance, and makes a proposal on the installation environment in descending order of the score.

13. The weighing apparatus according to claim 11, wherein
the storage unit further includes an analysis history database, and
the arithmetic processing unit stores the weighed data, the environmental data, the amounts of changes, and the average values used for the latest analysis in the analysis history database, reads out one of past analyses or an analysis obtained through learning with reference to the analysis history database, and with respect to each of the weighed data and the environmental data, compares the latest analysis and the past analysis or compares the latest analysis and the analysis obtained through learning, and according to the comparison results, reads out an improvement comment contrasting the latest environment with a past environment with reference to the improvement proposal database, and makes a proposal on the installation environment.

* * * * *